US008140539B1

(12) United States Patent
Cohen et al.

(10) Patent No.: US 8,140,539 B1
(45) Date of Patent: Mar. 20, 2012

(54) SYSTEMS, DEVICES, AND/OR METHODS FOR DETERMINING DATASET ESTIMATORS

(75) Inventors: Edith Cohen, Berkeley Heights, NJ (US); Haim Kaplan, Had Hasharon (IL)

(73) Assignee: AT&T Intellectual Property I, L.P., Atlanta, GA (US)

( * ) Notice: Subject to any disclaimer, the term of this patent is extended or adjusted under 35 U.S.C. 154(b) by 733 days.

(21) Appl. No.: 12/186,997

(22) Filed: Aug. 6, 2008

(51) Int. Cl.
*G06F 7/00* (2006.01)
*G06F 17/30* (2006.01)
(52) U.S. Cl. .......................................... 707/748; 706/48
(58) Field of Classification Search .................. None
See application file for complete search history.

(56) References Cited

U.S. PATENT DOCUMENTS

| | | | |
|---|---|---|---|
| 4,930,077 | A | 5/1990 | Fan |
| 5,371,673 | A | 12/1994 | Fan |
| 6,449,603 | B1 | 9/2002 | Hunter |
| 6,535,819 | B1 | 3/2003 | Clark |
| 2008/0086444 | A1 | 4/2008 | Yu |

OTHER PUBLICATIONS

Minimum delay routing in stochastic networks, by Orda et al, IEEE/ACM Transactions on Networking (TON), vol. 1 Issue 2, Apr. 1993, IEEE Press Piscataway, NJ, USA.*
Alon, "Estimating Arbitrary Subset Sums with Few Probes", Jun. 13, 2005, pp. 317-325, Proceeding of the 24th ACM Symposium on Principles of Database Systems.
Beyer, "On Synopses for Distinct-Value Estimation Under Multiset Operations", Jun. 12, 2007, pp. 199-210, SIGMOD '07, Beijing, China, ACM, 2007.
Bharat, "Mirror, Mirror on the Web: A Study of Host Pairs with Replicated Content", Jan. 1, 1999, pp. 501-512, Proceedings of the 8th International World Wide Web Conference (WWW).
Broder, "Identifying and Filtering Near-Duplicate Documents", 2000, 10 pages, Proceedings of the 11th Annual Symposium on Combinatorial Pattern Matching, LLNCS, V 1848; Springer-Verlag.
Broder, "Min-Wise Independent Permutations", Jun. 22, 1998, pp. 630-659, Journal of Computer and System Sciences, 60(3).
Broder, "On the resemblance and containment of documents", 1997, pp. 21-29, Proceedings of the Compression and Complexity of Sequences, ACM.
Chazelle, "Fractional Cascading: I. A Data Structuring Technique", Feb. 18, 1986, pp. 133-162, Algorithmica, 1(2); Springer-Verlag New York.
Chazelle, "Fractional Cascading: II. Applications", Feb. 18, 1986, pp. 163-191, Algorithmica, 1: Springer-Verlag New York.
Chiang, "Dynamic Algorithms in Computational Geometry", Sep. 1, 1992, pp. 1412-1434, Proceedings of the IEEE, 80(9).
Cisco, "Cisco Netflow", accessed prior to Aug. 6, 2008, 1 page, http://www.cisco.com/warp/public/732/Tech/netflow.
Cohen, "Algorithms and Estimators for Accurate Summarization of Internet Traffic", Oct. 24, 2007, pp. 265-278, Proceedings of the 7th ACM SIGCOMM Conference on Internet Measurement, San Diego, CA, US.

(Continued)

*Primary Examiner* — Jay Morrison
(74) *Attorney, Agent, or Firm* — Akerman Senterfitt; Michael K. Dixon; Roy Zachariah

(57) ABSTRACT

Certain exemplary embodiments can provide a method, which can comprise automatically storing a sketch of a dataset that supports automatic determination of an estimator of properties of a dataset. The automatic determination can be based upon computed adjusted weights to the items included in a sketch of the dataset. The adjusted weights can be used to compute estimates on the weight of any subpopulation of the items in the dataset that is specified using a selection predicate. We propose the rank conditioning, the subset conditioning, and/or a Markov-chain based method to compute these adjusted weights. We also provide a method that provides upper and lower confidence bounds on the size of a subpopulation.

20 Claims, 19 Drawing Sheets

OTHER PUBLICATIONS

Cohen, "Efficient Estimation Algorithms for Neighborhood Variance and Other Moments", Jan. 1, 2004, pp. 157-166, Proceedings of 15th ACM-SIAM Symposium on Discrete Algorithms, 2004.

Cohen, "Maintaining Time-Decaying Stream Aggregates", Jun. 9, 2003, 11 pages, Proceeding of the 2003 ACM Symposium on Principles of Database Systems (PODS 2003); ACM.

Cohen, "Size-Estimation Framework with Applications to Transitive Closure and Reachability", Jul. 8, 1996, Journal Comput. System Sci., 55, pp. 441-453.

Cohen, "Sketch-Based Estimation of Subpopulation-Weight", Feb. 23, 2008, 20 pages, Technical Report 802.3448, CORR; from ACM SIGMOD '08, Vancouver, BC, Canada.

Cohen, "Sketching Unaggregated Data Streams for Subpopulations-Size Queries", Jun. 11, 2007, pp. 253-262, Proceedings of the 2007 ACM Symposium on Principles of Database Systems (PODS 2007), Beijing, China; ACM 2007.

Cohen, "Spatially-Decaying Aggregation Over a Network: Model and Algorithms", Jun. 13, 2004, 12 pages, J. Comput. System Sci., 73, 2007.

Cohen, "Subpopulation-Weight Estimators and Confidence Bounds for Bottom-k Sketches", Oct. 26, 2007, 33 pages, AT&T Research Labs.

Cohen, "Summarizing Data Using Bottom-k Sketches", Aug. 12, 2007, 10 pages, Proceedings of ACM PODC' 07, Portland, Oregon, US.

Cohen, "Variance optimal sampling based estimation of subset sums", Mar. 4, 2008, 16 pages, Technical Reprot cs.DS/0803.0473, Computing Research Repository (CoRR).

Cohen, "When Piecewise Determinism is Almost True", Dec. 1, 1995, pp. 66-71, Proceedings of Pacific Rim International Symposium on Fault-Tolerant Systems.

Cohen, "Bottom-k Sketches: Better and More Efficient Estimation of Aggregates", Jun. 12, 2007, 2 pages, Proceedings of the ACM SIGMETRICS '07 Conference.

Dasu, "Mining Database Structure; Or, How to Build a Data Quality Browser", Jun. 4, 2002, pp. 240-251, ACM SIGMOD '2002, Madison, WI, US.

Driscoll, "Making Data Structures Persistent", Jan. 1, 1986, pp. 109-121, Proceedings of the 18th Annual ACM Symposium on Theory of Computing.

Duffield, "Flow Sampling Under Hard Resource Constraints", Jun. 12, 2004, pp. 85-96, Proceedings of the ACM IFIP Conference on Measurement and Modeling of Computer Systems (SIGMETRICS/Perfomance).

Duffield, "Learn More, Sample Less: Control of Volume and Variance in Network Measurement", May 1, 2005, pp. 1756-1775, IEEE Transactions in Information Theory, 51(5).

Duffield, "Priority Sampling for Estimation of Arbitrary Subset Sums", Dec. 1, 2007, 37 pages, Journal of the ACM, 54(6).

Flajolet, "Probabilistic Counting Algorithms for Data Base Applications", Oct. 1, 1985, pp. 182-209, Journal of Computer and System Sciences, 31, 2, Academic Press, NY, US.

Gibbons, "New Sampling-Based Summary Statistics for Improving Approximate Query Answers", Jun. 1, 1998, pp. 331-342, SIGMOD ACM, 27(2).

Henzinger, "Finding Near-Duplicate Web Pages: A Large-Scale Evaluation of Algorithms", Aug. 6, 2006, pp. 284-291, from SIGIR '06, Seattle, WA, US; ACM 2006.

Kaplan, "Randomized Incremental Constructions of Three-Dimensional Convex Hulls and Planar Voronoi Diagrams, and Approximate Range Counting", Jan. 22, 2006, pp. 484-493, SODA '06: Proceedings of the 17th Annual ACM-SIAM Symposium on Discrete Algorithm; ACM Press, New York, US.

Manku, "Detecting Near-Duplicates for Web Crawling", May 8, 2007, pp. 141-149, from IW3C2 (WWW) 2007, Banff, Alberta, Canada; ACM.

Mosk-Aoyama, "Computing Separable Functions via Gossip", Jul. 22, 2006, pp. 113-122, Proceedings of the ACM PODC '06 Conference, Denver, Colorado, US.

Motwani, "Finding Interesting Associations without Support Pruning", Oct. 19, 1999, 17 pages, IEEE Transactions on Knowledge and Data Engineering, 13, 2001.

Netflix, Inc., "The Netflix Prize", accessed prior to Aug. 6, 2008, 1 page, http://www.netflixprize.com.

Spring, "A Protocol-Independent Technique for Eliminating Redundant Network Traffic", Jan. 1, 2000, pp. 87-95, Proceedings of the ACM SIGCOMM '00 Conference, ACM 2000.

Szegedy, "The DLT Priority Sampling is Essentially Optimal", May 21, 2006, 9 pages, Proceedings of the 38th Annual ACM Symposium on Theory of Computing, Seattle, Washington, ACM 2006, USA.

Thorup, "Confidence Intervals for Priority Sampling", Jun. 26, 2006, pp. 252-263, from SIGMetrics/Perforrnance '06, Saint Malo France; ACM 2006.

Cohen, "Algorithms and Estimators for Summarization of Unaggregated Data Streams", Sep. 10, 2007, 39 pages, Available for download at www.research.att.com/~edith/Papers/unaggstreams.pdf.

Horvitz, "A Generalization of Sampling Without Replacement from a Finite Universe", Dec. 1952, pp. 633-685, Journal of the American Statistical Association, vol. 47, No. 260.

Rao, "πPS Sampling Designs and the Horvitz-Thompson Estimator", Dec. 1971, pp. 872-875, Journal of the American Statistical Association, vol. 66, No. 336.

Berg, "Computational Geometry: Algorithms and Applications, Third Edition", 1997, 2000, 2008, 386 pages, Springer Verlag, Berlin.

Sampath, "Sampling Theory and Methods", 2005, 199 pages, Alpha Science International, Harrow, U.K.

Singh, "Elements of Survey Sampling", 1996, 388 pages, Kluwer Academic Publishers, AA Dordrecht, The Netherlands.

\* cited by examiner

SYSTEMS, DEVICES, AND/OR METHODS FOR DETERMINING DATASET ESTIMATORS

CROSS-REFERENCES TO RELATED APPLICATIONS

This application incorporates by reference herein in its entirety, a related and concurrently filed application entitled "Systems, Devices, and/or Methods for Managing Data" Ser No. 12/186,873.

BACKGROUND

United States Patent Publication 20080086444 ("Yu"), which is incorporated by reference herein in its entirety, allegedly discloses a "system and method for improving cardinality estimation in a relational database management system is provided. The method is suitable for use with a query optimizer for improved estimation of various predicates in the query optimizer's cost estimation plan by combining pre-computed statistics and information from sampled data. The system and method include sampling a relational database for generating a sample dataset and estimating cardinalities of the sample dataset. The estimated cardinalities sample datasets are reduced in accordance with the present invention by determining a first and second weight set, and minimizing a distance between the first and second weight set." See Abstract.

U.S. Pat. No. 6,535,819 ("Clark"), which is incorporated by reference herein in its entirety, allegedly discloses "[t]he method of this invention identifies distinctive items of information from a larger body of information on the basis of similarities or dissimilarities among the items and achieves a significant increase in speed as well as the ability to balance the representativeness and diversity among the identified items by applying selection criteria to randomly chosen sub-samples of all the information. The method is illustrated with reference to the compound selection requirements of medicinal chemists. Compound selection methods currently available to chemists are based on maximum or minimum dissimilarity selection or on hierarchical clustering. The method of the invention is more general and incorporates maximum and minimum dissimilarity-based selection as special cases. In addition, the number of iterations utilized to select the items is a multiple of the group size which, at its greatest, is approximately the square root of the population size. Thus, the selection method runs much faster than the methods of the prior art. Further, by adjusting the subsample size parameter K, it is possible to control the balance between representativeness and diversity in the compounds selected. In addition, the method can mimic the distributional properties of selections based on hierarchical clustering and, at least in some cases, improve upon them." See Abstract.

SUMMARY

Certain exemplary embodiments can provide a method, which can comprise automatically storing an estimator of properties of a dataset. The estimator can be based upon computed adjusted weights of a first sketch of the dataset. The adjusted weights can be applied to items comprised in a second sketch. The adjusted weights adapted to be used to estimate a size of subpopulations of items.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
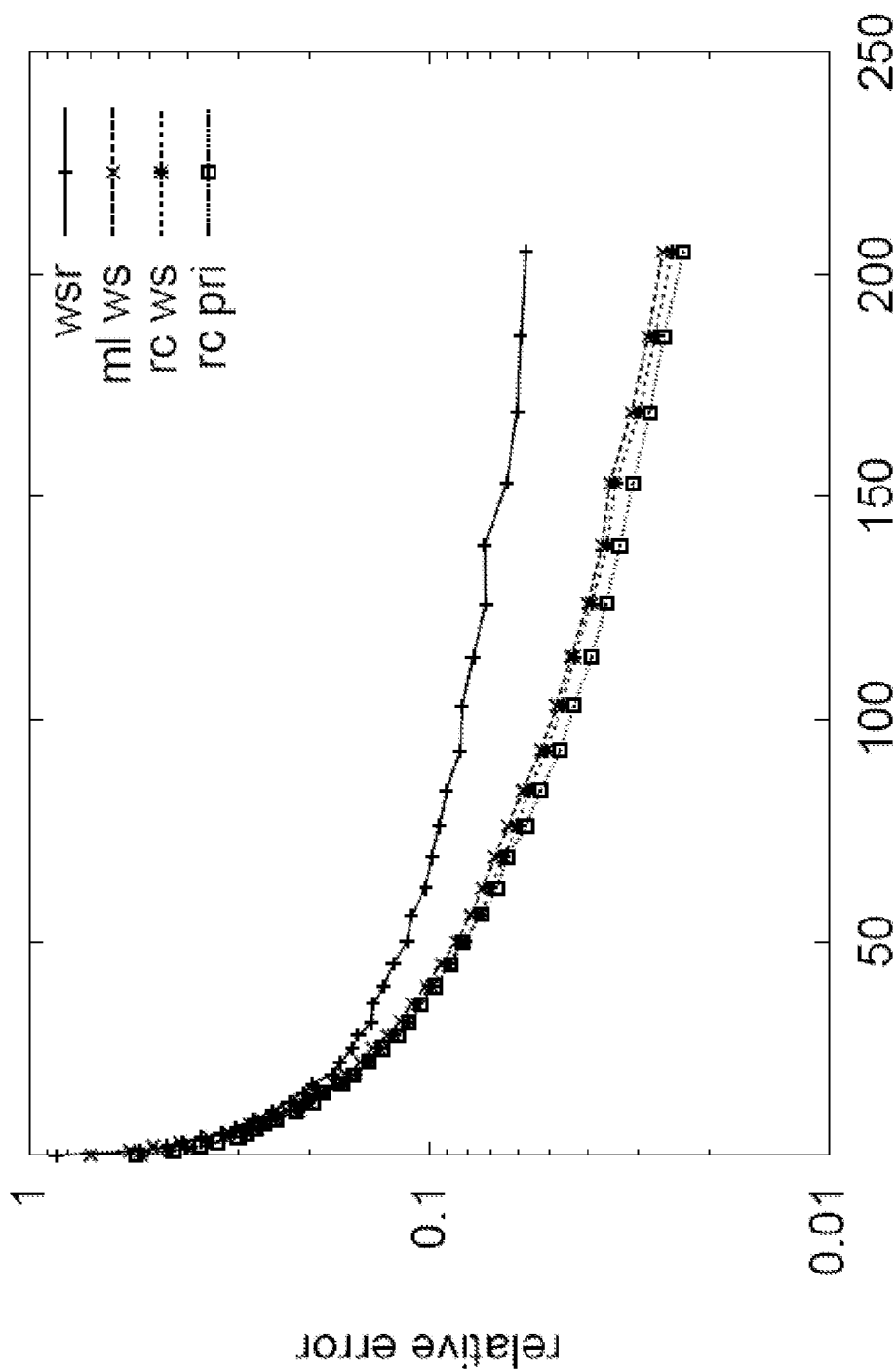
FIG. 1 is a block diagram of an exemplary embodiment of a set if graphs indicative of absolute relative errors in estimated parameters as a function of sketch size for exemplary k-min sketches and bottom-k sketches for various sketches.

Certain exemplary embodiments can provide a method, which can comprise automatically storing an estimator of properties of a dataset. The estimator can be based upon computed adjusted weights of a first sketch of the dataset. The adjusted weights can be applied to items comprised in a second sketch. The adjusted weights adapted to be used to estimate a size of subpopulations of items.

The following indented paragraphs immediately following the present paragraph describe one or more exemplary embodiments and are, with the exception of definitions provided therein, illustrative and not restrictive in their scope.

Summaries of massive datasets support approximate query processing over the original data. As used herein, the phrase query means (n.) a request, such as for information from a database; (v.) to request and/or obtain information, such as from a database in response to a structured request. As used herein, the phrase request means (v.) to express a need and/or desire for; to inquire and/or ask for; (n.) that which communicates an expression of desire and/or that which is asked for. As used herein, the phrase data means information represented in a form suitable for processing by an information device. As used herein, the phrase information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information. As used herein, the phrase device means a machine, manufacture, and/or collection thereof. A basic aggregate over a set of records is the weight of subpopulations specified as a predicate over records' attributes. As used herein, the phrase weight means a numeric value (non-negative real number) that is associated with an item. As used herein, the phrase subpopulation means a portion of a larger set of data and/or entities. As used herein, the phrase record means a collection of structured data elements organized by fields. A group of records forms a file, table, and/or database. For example, a record might comprise data elements stored in fields such as: a name field, an address field, and a phone number field. As used herein, the phrase store means to place, hold, and/or retain in a memory. As used herein, the phrase a means at least one.

Bottom-k sketches are a powerful summarization format of weighted items that includes priority sampling (PRI) and the classic weighted sampling without replacement (WS). As used herein, the phrase sketch means a summary of a set of items with nonnegative weights that supports approximate query processing. As used herein, the phrase item means a single article of a plurality of articles. As used herein, the phrase plurality means the state of being plural and/or more than one. As used herein, the phrase bottom-k sketch means a summary of a set of items with nonnegative weights that supports approximate query processing. They can be computed efficiently for many representations of the data including distributed databases and data streams and support coordinated and all-distances sketches. As used herein, the phrase distance means a measure of physical and/or logical separation. As used herein, the phrase coordinate means to interact regarding movements and/or functions. As used herein, the phrase compute means to calculate, estimate, determine, and/or ascertain via a processor. As used herein, the phrase via means by way of and/or utilizing.

As used herein, the phrase processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller. As used herein, the phrase estimate means (n.) a calculated value approximating an actual value; (v.) to calculate and/or determine approximately and/or tentatively. As used herein, the phrase value means a measured, assigned, determined, and/or calculated quantity or quality for a variable and/or parameter. As used herein, the phrase determine means to find and/or decide upon. As used herein, the phrase can means is capable of, in at least some embodiments.

We derive novel unbiased estimators and efficient confidence bounds for subpopulation weight. As used herein, the phrase unbiased means characterized by a lack of partiality. As used herein, the phrase estimator means a statistical and/or calculable parameter associated with a population and/or a sub-population. As used herein, the phrase derive means obtain via determining, calculating, and/or looking up. As used herein, the phrase obtain means to receive, get, take possession of, procure, acquire, calculate, determine, and/or compute. As used herein, the phrase receive means to obtain, take, and/or acquire. Our rank conditioning (RC) estimator is applicable when the total weight of the sketched set can not be computed by the summarization algorithm without a significant use of additional resources (such as for sketches of network neighborhoods) and the tighter subset conditioning (SC) estimator that is applicable when the total weight is available (sketches of data streams). As used herein, the phrase total means of, relating to, or constituting a whole. As used herein, the phrase subset means a portion of a set. As used herein, the phrase rank means an independent random variable assigned to an item that is drawn from a distribution that depends on the weight of the item.

As used herein, the phrase network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof. As used herein, the phrase router means a device adapted to direct traffic and/or determine the next network point to which a data packet should be forwarded enroute toward its destination. The router is connected to at least two networks and determines which way to send each data packet based on its current understanding of the state of the networks it is connected to. Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model. As used herein, the phrase provide means to furnish, supply, give, convey, send, and/or make available. As used herein, the phrase neighborhood means a nearby area. As used herein, the phrase subset conditioning means an algorithm that assigns adjusted weights to items included in a bottom-k sketch of a dataset. As used herein, the phrase dataset means a relatively large body of information represented in a form suitable for processing by an information device. As used herein, the phrase adjust means to modify. As used herein, the phrase modify means to change, cause to change, edit, alter, replace, delete, and/or correct. As used herein, the phrase replace means to substitute one thing for another. The adjusted weights are used for estimating the weight of subpopulations of the original dataset. Subset conditioning is applicable to bottom-k sketch with exponentially distributed ranks and when the total weight of the dataset is known. As used herein, the phrase known means recognized or understood. As used herein, the phrase exponentially distributed means a random variable from an exponential distribution, that is, a distribution with probability density function: $\lambda e^{-\lambda x}$ for x>=0 and 0 for x<0. As used herein, the phrase from means used to indicate a source.

Our estimators are derived using clever applications of the Horvitz-Thompson estimator (that is not directly applicable to bottom-k sketches). As used herein, the phrase Horvitz-Thompson estimator means an unbiased parameter of a population total of a finite population, applicable in a general case where individuals are sampled with unequal probabilities. As used herein, the phrase application means a set of computer-readable instructions and/or a computer program. We develop efficient computational methods and conduct performance evaluation using a range of synthetic and real datasets. As used herein, the phrase method means a process, procedure, and/or collection of related activities for accomplishing something. We demonstrate considerable benefits of the ws SC estimator on larger subpopulations (over all other estimators); of the ws RC estimator (over existing estimators for this basic sampling method); and of our confidence bounds (over all previous approaches). Overall, we significantly advance the state-of-the-art estimation of subpopulation weight queries.

Consider a weighted set (I,w) where I is a set of records, and w is a weight function assigning a weight $w(i) \geq 0$ for each $i \in I$. As used herein, the phrase each means every one of a group considered individually. A basic aggregate over such sets is subpopulation weight. A subpopulation weight query specifies a subpopulation $J \subset I$ as a predicate on the values of the attributes of the records in I. The result of the query is w(J), the sum of the weights of records in J. As used herein, the phrase sum means a total obtained via the addition of a plurality of values. This aggregate can be used to estimate other aggregates over subpopulations such as selectivity (w(J)/w(I)), variance, and higher moments of $\{w(i)|i \in J\}$. As used herein, the phrase variance means a measure of variation of a set of observations defined by a sum of the squares of deviations from a mean, divided by a number of degrees of freedom in the set of observations. As used herein, the phrase selectivity means a fraction of items that satisfy a given predicate regarding items attribute values.

We study probabilistic summarization algorithms, producing a small sketch of the original data, from which we can answer subpopulation weight queries approximately. As used herein, the phrase answer means (n.) a reply and/or response; (v.) to reply. The use of sketches speeds up query processing and addresses storage limitations when the original dataset need not be stored at all, is distributed, or resides on a slower media.

In order to support subpopulation selection with arbitrary predicates, the summary can retain content of some individual records so we can tell for each record in the sketch whether it belongs to the subpopulation or not. As used herein, the phrase order means a degree in a continuum of size or quantity. As used herein, the phrase size means physical dimensions, proportions, magnitude, amount, and/or extent of an entity. As used herein, the phrase arbitrary means not necessarily conforming to a predetermined structure. As used herein, the phrase predetermined means determine, decide, or establish in advance. As used herein, the phrase record means a collection of structured data elements organized by fields. A group of records forms a file, table, and/or database. As used herein, the phrase and/or means either in conjunction with or in alternative to. For example, a record might comprise data elements stored in fields such as: a name field, an address field, and a phone number field. As used herein, the phrase comprise means to include, but not be limited to, what follows.

Two such methods are k-mins and bottom-k sketches. Bottom-k sketches are obtained by assigning a rank, r(i) to each record $i \in I$ that is independently drawn from a distribution that depends on w(i). The bottom-k sketch contains the k records with smallest ranks The distribution of the sketches is determined by the family of distributions that is used to draw the ranks If we draw r(i) from an exponential distribution with parameter w(i) then we obtain sketches that are distributed as if we draw records without replacement with probability proportional to their weights. We denote sampling without replacement with probability proportional to their weights by ws, and we call a bottom-k sketch with exponential ranks a ws sketch.

k-mins sketches are obtained by assigning independent random ranks to records (again, the distribution used for each record depends on the weight of the record). The record of smallest rank is selected, and this is repeated k times, using k independent rank assignments. As used herein, the phrase select means to make and/or indicate a choice and/or selection from among alternatives. k-mins sketches are equivalent to weighted sampling with replacement (WSR) if we draw r(i) from an exponential distribution with parameter w(i). We call such a k-mins sketch a k-mins WSR sketch.

Subpopulation weight query is a general primitive with numerous applications. We give three concrete examples where bottom-k sketches can play an important role.

Consider the set of all IP flows going through a router during some time period. As used herein, the phrase through means in one side and out the opposite or another side of, across, among, and/or between. As used herein, the phrase flow means (n.) a continuous transfer of packets; (v.) to continuously transfer. As used herein, the phrase packets means a collection of digital data comprised of information and an associated header transmitted over a packet-switching network. As used herein, the phrase router means a device adapted to direct traffic and/or determine the next network point to which a data packet should be forwarded enroute toward its destination. As used herein, the phrase adapted to means suitable, fit, and/or capable of performing a specified function. As used herein, the phrase perform means to begin, take action, do, fulfill, accomplish, carry out, and/or complete, such as in accordance with one or more criterion. The router is connected to at least two networks and determines which way to send each data packet based on its current understanding of the state of the networks it is connected to. Routers create or maintain a table of the available routes and use this information to determine the best route for a given data packet. As used herein, the phrase maintain means to retain, preserve, sustain, keep in an existing state, and/or continue to obtain. As used herein, the phrase create means to make, form, produce, generate, bring into being, and/or cause to exist. As used herein, the phrase generate means to create, produce, render, give rise to, and/or bring into existence. As used herein, the phrase render means to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc. Examples include a router, route-reflector, route server, server-based router, router-switch, sets of routers, and/or intra-networking devices, etc. A typical router operates at least at the bottom 3 layers (Physical, Link, and Network layers) of the OSI model. Flow records containing this information are collected at IP routers by tools such as Cisco's NetFlow (now emerging as an IETF standard). Each flow record contains the number of packets and bytes of the flow. As used herein, the phrase packets means a collection of digital data comprised of information and an associated header transmitted over a packet-switching network. A router can produce a bottom-k sketch of the flows that it collects during a time period, before moving the raw data to external storage or discarding it. A network manager can then use the sketches from a single router or from multiple routers to answer various subpopulation queries. For example, estimate "the bandwidth used for an application such as p2p or Web traffic" or "the bandwidth destined to a specified Autonomous System." As used herein, the phrase system means a collection of mechanisms, devices, machines, articles of manufacture, processes, data, and/or instructions, the collection designed to perform one or more specific functions. The ability to answer such queries is critical for improving network performance, and for anomaly detection.

Consider a census database that includes a record for each household with associated weight equal to the household income. We can use a bottom-k sketch of this dataset to estimate, for example, the total income by region or by the gender of the head of the household.

Consider a peer to peer network where each node has a database of songs that it is sharing with the other peers. Each peer maintains a bottom-k sketch of the union of the sets of songs of all peers within a certain distance (e.g. hops) from it. As used herein, the phrase union means a set containing all and only the members of two or more given sets. If it keeps such sketch for every distance then the collection of these sketches is called all distances sketches, and can be stored compactly. As used herein, the phrase all distance bottom-k sketch means a compact encoding of plain bottom-k sketches of neighborhoods of a certain location in which, for a given distance, the sketch in a neighborhood within the given distance of the location can be constructed from the all-distances sketch. As used herein, the phrase location means a place. The peer can use this sketch to find out how many songs of a particular singer there are in close peers, how many songs of a particular genre are in the entire network etc.

Bottom-k and k-mins sketches can be used to summarize a single weighted set or to summarize multiple sets that are defined over the same universe of items. As used herein, the phrase define means to establish the meaning, relationship, outline, form, and/or structure of; and/or to precisely and/or distinctly describe and/or specify. When we summarize multiple sets we want the sketches of different sets to be defined using the same rank assignment to the items. As used herein, the phrase different means changed, distinct, and/or separate. That is if, say, two sets A and B contain some item x, then we compute a rank for x once, and use this rank to compute the sketches of both A and B. We call sketches of multiple sets that share the rank assignment coordinated sketches.

Coordinated sketches support subpopulation selection queries based on subsets' memberships. In particular we can estimate sizes of intersections and unions of sets. For example, on datasets of IP flow records from several different routers; using coordinated sketches (one for each router) we can approximate queries like "How many flows to a particular destination pass through a particular subset of the routers". Another example is the content of neighborhoods of different radii of different peers in a peer to peer network. Using coordinated sketches we can, for example, estimate how many songs of the Beatles are both at a distance at most $\rho_1$ from peer v and at a distance at most $\rho_2$ from peer w.

Another advantage of coordinated sketches is that they are much more efficient to compute in common distributed setups: The fact that we use the same ranks allows us to reduce the number of messages needed to compute the sketches. See further explanations, infra. As used herein, the phrase further means in addition.

We develop accurate estimators and confidence intervals for subpopulation weight queries for bottom-k sketches and in particular for ws sketches. As used herein, the phrase confidence interval means a calculated estimate of a range of probable values of a determined population parameter. As used herein, the phrase calculate means to compute.

Our estimators are of two kinds
(1) Estimators that are based on the Maximum Likelihood (ML) principle. While biased, ws ML estimators can be computed efficiently and perform well in practice.
(2) Estimators that generalize the basic Horvitz-Thompson (HT) estimator.

The HT estimator assigns to each included record i an adjusted weight a(i) equals to w(i) divided by the probability that i is included in a sketch. Clearly, the expected adjusted weight of record i equals w(i). The estimate of a subpopulation is the sum of the adjusted weights of the records in the sketch that belong to the subpopulation and is easily computed from the sketch by applying the selection predicate to included records. This is clearly unbiased.

The HT estimator minimizes the per-record variance of the adjusted weight for the particular distribution over sketches. The HT estimator, however, cannot be computed for bottom-k sketches, since the probability that a record is included in a sketch cannot be determined from the information available in the sketch alone. Our variant, which we refer to as HT on a partitioned sample space (HTP), overcomes this hurdle by applying the HT estimator on a partition of the sample space such that inclusion probability of records can be computed in each subspace. We believe that this technique of generalizing the HT estimator may be useful in other contexts. As used herein, the phrase may means is allowed and/or permitted to, in at least some embodiments. As an indication for this we point out that our derivation generalizes and simplifies one for priority sampling and reveals general principles.

We derive two HT-based estimators. One (rank-conditioning (RC)) is suitable to use when the total weight of the sketched set is not known, and a tighter estimator (subset-conditioning (SC)) to be used when the total weight of the sketched set is known. Our RC estimator generalizes priority sampling, the best known estimator prior to this work. The SC estimator that uses the total weight is much tighter for larger subpopulations than any known estimator based on a sketching method that supports coordinated sketches.

From basic properties of the variance of a sum of random variables follows that the variance of our estimate of a particular subpopulation J is equal to $\Sigma_{i \in J} \text{var}[a(i)] + \Sigma_{i \neq j, i, j \in J} \text{cov}[a(i), a(j)]$, where $\text{cov}[a(i), a(j)]$ is the covariance of the adjusted weights of records i and j. As used herein, the phrase covariance means the product of the standard deviations of two given variables and the coefficient of correlation between them. For all RC estimators (and priority sampling), the covariances of different records are 0. Our SC estimator, however, has negative covariances of different records. As used herein, the phrase negative means less than approximately zero. As used herein, the phrase zero means a mathematical value intermediate between positive and negative values. Moreover, the sum of covariances is minimized. This guarantees that the variance of our estimator for any subpopulation is no larger and generally much smaller than the sum of the variances of the adjusted weights of the individual records of the subpopulation. This important property boosts accuracy, in particular for large subpopulations. As used herein, the phrase property means a parameter associated with a characteristic.

Confidence intervals are critical for many applications. We derive confidence intervals (tailored to applications where the total weight is or is not provided) and develop methods to efficiently compute these bounds. We compare our confidence bounds with previous approaches (a bound for PRI sketches and known WSR estimators) and show that our confidence interval are about ½ the width of the best previously known with any sketching method.

In we initiated a comparison between bottom-k and k-mins sketches. As used herein, the phrase between means in a separating interval and/or intermediate to. The focus there was on quantifying the resources (storage, communication) utilized to produce these sketches. We distinguished between explicit and implicit representations of the data. Explicit representations list the occurrence of each record in each set which we sketch. These include a data stream of the items in a single set or item-set pairs if we sketch many sets (for example, item-basket associations in a market basket data, links in web pages, and/or features in documents, etc.). As used herein, the phrase market means (n.) a commercial activity; (v.) to encourage buyers and/or to attempt to sell. Certain exemplary embodiments can compute Bottom-k sketches more efficiently than k-mins sketches when the data is represented explicitly.

Implicit representations are those where the multiple sets which we sketch are specified succinctly. As an example consider the peer to peer network described above. All sketched sets are implicitly represented by the network itself. In these applications, the summarization algorithm is applied to the succinct representation (the network itself in this example). As used herein, the phrase applied means incident directly and/or indirectly upon. As mentioned before computing coordinated sketches in this application not only make the sketches more informative but also allow efficient computation. Intuitively this happens because if the record of node w is not contained in sketch of node v for radius ρ then it would not be in the ρ-sketch of any node further away from w than v. Certain exemplary embodiments can compute Bottom-k sketches as efficiently as k-mins sketches for these applications.

Certain exemplary embodiments can consider the information content in the sketches, claiming that bottom-k sketches are more informative. Intuitively, one can think of a distribution with one dominant item. In a k-mins WSR sketch this item is likely to appear k times in the sketch whereas in a bottom-k sketch we get k−1 additional items. More concretely we show in how one can probabilistically produce a k-mins sketch from a bottom-k sketch, when using exponential ranks. The distribution induced on k-mins sketch is the same as if we were drawing them directly to begin with using multiple rank functions. We called this process mimicking k-mins sketches from bottom-k sketches.

Mimicking k-mins sketches from bottom-k sketches allows us to apply simple estimators for k-mins sketches to bottom-k sketches. This, however, does not fully utilize the information in bottom-k sketches. Certain exemplary embodiments focus on finding accurate estimators and confidence intervals for subpopulation weight queries that fully utilize the information in bottom-k sketches.

Beyond computation issues, the distinction between data representations is also important for estimation. In applications with explicit representation, the summarization algorithm can compute the total weight of the records without a significant processing or communication overhead. On the other hand, in applications where the data is implicit, and often many sets are sketched, the total weight is not readily available. For example, in our p2p application computing the exact total weight of every neighborhood is much more resource consuming than obtaining all sketches. Motivated by this observation we develop estimators and confidence intervals for subpopulation weight queries for both scenarios: Estimators and confidence intervals that do not use the total weight as well as estimators and confidence intervals that do use the total weight for better accuracy.

A dominant estimator for subpopulation weight to date is based on priority sampling. This estimator emerged as a clever modification of threshold sampling so that a fixed size sample is produced. Estimators based on priority sampling perform similarly to estimators based on threshold sampling, and are better than estimators based on WSR. Priority sampling was also shown to minimize the sum of per-record variances.

Priority sampling, however, was not compared to weighted sampling without replacement. In fact it is easy to see that a priority sample is also a bottom-k sketch for a different rank function. We call this sketch a PRI sketch. It follows from this observation, that certain exemplary embodiments can provide a general framework for bottom-k sketches, and gives a simpler proof that an estimator for priority sampling is unbiased. We thereby put both priority sampling and weighted sampling without replacement within a unified framework.

We compare the accuracy of the estimators for WS sketches with the estimators of PRI sketches and show that their performance is similar. As already mentioned we then make a strong case for WS sketches by showing that 1) the confidence intervals which we develop for WS sketches are much tighter (about half the width) than confidence intervals for pri sketches, and by 2) developing estimators for WS sketches that use the total weight whose variance is ⅓ of the variance of pri sketches. Another advantage of WS sketches is that they can often be computed much more efficiently than PRI sketches.

Motivated by the work we present here, a sampling scheme which minimizes the sum of variances of sets of any fixed size has been developed. This sampling scheme is not a bottom-k sketch. In particular, it does not support coordinated and all-distances sketches that facilitate efficient computation of multiple sketches and selection queries based on subsets' membership. Furthermore, it is not known how to compute confidence intervals for this new scheme. As used herein, the phrase new means having been made, defined, determined, and/or coming into existence relatively recently as compared to something else. The estimators based on the new scheme, however, are expected to be better than estimators based on priority sampling and similar to our estimators here which use the total weight. Coordinated bottom-k sketches have the property that the sketch of the union of multiple subsets can be easily computed from individual sketches. We can determine membership information in each subset for each item included in the union, and therefore, we can apply our bottom-k estimators and bounds with selection predicates based on subsets' memberships.

Certain exemplary embodiments can utilize one or more algorithms for sketching unaggregated data. In this setup each item may be broken into many different pieces each with its own weight. The sum of the weights of the pieces is equal to the weight of the item. As an example think of an IP flow broken into its individual packets. The problem is to get a sketch of the dataset for subpopulation queries without pre-aggregating the data which may utilize substantial resources. Certain exemplary embodiments can utilize one or more of several estimators for this setup, some particularly appropriate for routers' architectures. Certain exemplary embodiments can apply a sampling technique to unaggregated data.

Certain exemplary embodiments can support subpopulation selection, be efficient for skewed (Zipf-like) weight distributions, summaries that can be computed efficiently over massive datasets, and/or coordinated sketches, etc.

Let $(I, w)$ be a weighted set. A rank assignment $r$ maps each item $i$ to a random rank $r(i)$. The ranks of items are drawn independently using a family of distributions $f_w(w \geq 0)$, where the rank of an item with weight $w(i)$ is drawn from $f_{w(i)}$. We assume that we use enough bits to represent the ranks such that no two items obtain the same rank. For a subset $J$ of items and a rank assignment $r$, we denote by $i_j$ the item of $j$ th largest rank in $J$. We also define $r(J)=r(i_1)$ to be the smallest rank in $J$ according to $r$.

A k-mins sketches of a set $J$ is the vector $$(r^{(1)}(J), r^{(2)}(J), \ldots, r^{(k)}(J))$$

where $r^{(1)} r^{(k)}$ are k independent rank assignments. For some applications we store with $r^{(l)}(J)$, $1 \leq l \leq k$, additional attributes of the corresponding item such as its weight. As used herein, the phrase corresponding means related, associated, accompanying, similar in purpose and/or position, conforming in every respect, and/or equivalent and/or agreeing in amount, quantity, magnitude, quality, and/or degree.

A bottom-k sketch is produced from a single rank assignment $r$. It is the list of the k pairs $(r(i_j), w(i_j))$, $1 \leq j \leq k$, sorted by increasing rank together with $r(i_{k+1})$. Depending on the application we may store with the sketch additional attributes of the items that attain the k smallest ranks (If $|J|<k$ then the sketch contains only $|J|$ pairs.) We often abbreviate $r(i_{k+1})$ to $r_{k+1}$.

Bottom-k sketches can include the items' weights but can omit all rank values except $r_{k+1}$. The reason is that using the weights of the items with k smallest ranks and $r_{k+1}$, we can redraw the rank value of an item with weight w from the density function $f_w(x)/F_w(r_{k+1})$ for $0 \leq x \leq r_{k+1}$ and 0 else-where. Here $F_w(x)$ is the cumulative distribution function of $f_w$. This is equivalent to redrawing a rank assignment from the subspace where the k smallest items are fixed as well as $r_{k+1}$.

The choice of which family of random rank functions to use matters only when items are weighted. Otherwise, we can map (bijectively) the ranks of one rank function to ranks of another rank function in a way that preserves the bottom-k sketch. We map r such that $F_1(r)=\alpha$ to r' such that $F_2(r')=\alpha$, where $F_1$ is the CDF of the first rank function and $F_2$ is the CDF of the other (assuming the CDFs are continuous). As used herein, the phrase first means an initial element in an ordering. Rank functions $f_w$ with some useful properties are exponential distributions with parameter w. The density function of this distribution is $f_w(x)=we^{-wx}$, and its cumulative distribution function is $F_w(x)=1-e^{-wx}$. Since the minimum of independent exponentially distributed random variables is exponentially distributed with parameter equal to the sum of the parameters of these distributions it follows that r(J) for a subset $J$ is exponentially distributed with parameter $w(J)=\Sigma_{i \in J} w(i)$. Certain exemplary embodiments can obtain unbiased low-variance estimators for both the weight and the inverse weight of a set J using a k-mins sketch of J. Estimators for the inverse-weight are useful for obtaining unbiased estimates for quantities where the weight appears in the denominator such as the weight ratio of two different subsets.

With exponential ranks the item with the minimum rank r(J) is a weighted random sample from J: The probability that an item $i \in J$ is the item of minimum rank is $w(i)/w(J)$. Therefore, a k-mins sketch of a subset J corresponds to a weighted random sample of size k, drawn with replacement from J. We call k-mins sketch using exponential ranks a WSR sketch. On the other hand, a bottom-k sketch of a subset J with exponential ranks corresponds to a weighted k-sample drawn without replacement from J. We call such a sketch a WS sketch.

The following property of exponentially-distributed ranks is a consequence of the memoryless nature of the exponential distribution.

Lemma 16. Consider a probability subspace of rank assignments over J where the k items of smallest ranks are $i_1, \ldots, i_k$ in increasing rank order. The rank differences $r_1(J)$, $r_2(J)-r_1(J)$, ..., $r_{k+1}(J)-r_k(J)$ are independent random variables, where $r_j(J)-r_{j-1}(J)$ (j=1,...,k+1) is exponentially distributed with parameter $w(J)-\Sigma_{i=1}^{j-1} w(i_l)$. (we formally define $r_0(J)=0$.)

WS sketches can often be computed more efficiently than other bottom-k: Computing a bottom-k sketch on unaggregated data (each item appears in multiple "pieces") generally utilizes pre-aggregating the data, so that we have a list of all items and their weight, which is a costly operation when the data is distributed or in external memory. As used herein, the phrase cost means an amount of time and/or money associated with an activity. A key property of exponential ranks is that we can obtain a rank value for an item by computing independently a rank value for each piece, based on the weight of the piece. The rank value of the item is the minimum rank value of its pieces. The WS sketch can therefore be computed in two O(k) communication rounds over distributed data or in two linear passes using O(k) memory: The first pass identifies the k items with smallest rank values. The second pass is used to add up the weights of the pieces of each of these k items. As used herein, the phrase second means an element in an ordering that immediately follows an initial element.

Bottom-k computation utilizes processing of each item. When items are partitioned such that we have the weight of each part, WS sketches can be computed while processing only a fraction of the items. A key property is that the minimum rank value over a set of items depends only on the sum of the weights of the items. Using this property, we can quickly determine which parts contribute to the sketch and eliminate chunks of items that belong to other parts.

The same property is also useful when sketches are computed online over a stream. Bottom-k sketches are produced using a priority queue that maintains the k+1 items with smallest ranks We draw a rank for each item and update the queue if this rank is smaller than the largest rank in the queue. With ws sketches, we can simply draw directly from a distribution the accumulated weight of items that can be "skipped" before we obtain an item with a smaller rank value than the largest rank in the queue. The stream algorithm simply adds up the weight of items until it reaches one that is incorporated in the sketch.

With priority ranks the rank value of an item with weight w is selected uniformly at random from $[0,1/w]$. This is equivalent to choosing a rank value $r/w$, where $r \in U[0,1]$, the uniform distribution on the interval $[0,1]$. If $r \in U[0,1]$ then $-\ln(r)/w$ is an exponential random variable with parameter w. Therefore, in contrast with priority ranks, exponential ranks correspond to using rank values $-\ln r/w$ where $r \in U[0,1]$.

PRI sketches are of interest because one can derive from them an estimator that (nearly) minimizes the sum of per-item variances $\Sigma_{i \in I} \text{var}[\tilde{w}(i)]$. In certain exemplary embodiments, the sum of per-item variances using PRI sketches of size k is no larger than the smallest sum of variances attainable by an estimator that uses sketches with average size k−1. Such embodiments might apply only to estimators based on adjusted weight assignments.

Recall that for a subset J, the rank values in the k-mins sketch $r_1(J), \ldots, r_k(J)$ are k independent samples from an exponential distribution with parameter w(J). The quantity $$\frac{k-1}{\sum_{h=1}^{k} r_h(J)}$$

is an unbiased estimator of w(J). The standard deviation of this estimator is equal to $w(J)/\sqrt{k-2}$ and the average relative error is approximately $\sqrt{2/(\pi(k-2))}$. The quantity $$\frac{k}{\sum_{h=1}^{k} r_h(J)}$$

is the maximum likelihood estimator of w(J). This estimator is a factor of $k/(k-1)$ larger than the unbiased estimator. Hence, it is obviously biased, and the bias is equal to $w(J)/(k-1)$. Since the standard deviation is about $(1/\sqrt{k})w(J)$, the bias is not significant when $k \gg 1$. The quantity $$\frac{\sum_{h=1}^{k} r_h(J)}{k}$$

is an unbiased estimator of the inverse weight $1/w(J)$. The standard deviation of this estimate is $1/(\sqrt{k}w(J))$.

Certain exemplary embodiments can apply the Maximum Likelihood (ML) principle to derive ws ML estimators. These estimators are applicable to ws sketches as our derivation exploits special properties of the exponential distribution used to produce these sketches. We show the derivation of an estimator for the total weight of the sketched set. Using the same technique in a slightly more subtle way we obtain similar estimators for the weight of a subpopulation when we do not know the total weight and when we do know the total weight.

Consider a set I and its bottom-k sketch s. Recall that $i_1, i_2, \ldots, i_k$ are the items in s ordered by increasing ranks (We assume that $|k|<|I|$ as otherwise w(I) is just the sum of the weights of the items in the sketch).

Consider the rank differences, $r(i_1), r(i_2)-r(i_1), \ldots, r(i_{k+1})-r(i_k)$. From Lemma 16, they are independent exponentially distributed random variables in the appropriate subspace. The joint probability density function of this set of differences is therefore the product of the density functions $$w(I)\exp(-w(I)r(i_1))(w(I)-s_1)\exp(-(w(I)-s_1)(r(i_2)-r(i_1)))$$

where $s_l = \Sigma_{j=1}^{l} w(i_j)$. Think about this probability density as a function of w(I). The maximum likelihood estimate for w(I) is the value that maximizes this function. To find the maximum, take the natural logarithm (for simplification) of the expression and look at the value which makes the derivative zero. We obtain that the maximum likelihood estimator $\tilde{w}(I)$ is the solution of the equation $$\sum_{i=0}^{k} \frac{1}{\tilde{w}(I)-s_i} = r(i_{k+1}). \quad (1)$$

The left hand side is a monotone function, and the equation can be solved by a binary search on the range $[s_k+1/r(i_{k+1}), s_k+(k+1)/r(i_{k+1})]$.

Certain exemplary embodiments can utilize variants of the Horvitz-Thompson (HT) estimator.

Definition 4. Adjusted-weight summary (AW-summary) of a weighted set (I, w) is a probability distribution $\Omega$ over weighted sets b of the form b=(J,a) where $J \subset I$ and a is a weight function on J, such that for all $i \in I$, $E[a(i)]=w(i)$. (To compute this expectation we extend the weight function from J to I by assigning $a(i)=0$ for items $i \in I, J$). As used herein, the phrase expectation means a statistical mean value. For $i \in J$ we call a(i) the adjusted weight of i in b.

An AW-summarization algorithm is a probabilistic algorithm that inputs a weighted set (I, w) and returns a weighted set according to some AW-summary of (I, w). An AW-summarization algorithm for (I, w) provides unbiased estimators for the weight of I and for the weight of subsets of I: By linearity of expectation, for any $H \subset I$, the sum $\Sigma_{i \in H} a(i)$ is an unbiased estimator of w(H). A very useful property of adjusted weights when there are multiple objectives is that they provide unbiased aggregations over any other numeric attribute: For weights h(i), $\Sigma_{i \in H} h(i)a(i)/w(i)$ is an unbiased estimator of h(J).

Let $\Omega$ be the probability space of rank assignments over I. Each $r \in \Omega$ has a sketch s(r) associated with it. As used herein, the phrase associated with means related to. Suppose that given the sampled ranks and s(r) we can compute the probability $\Pr\{i \in s(r)|r \in \Omega\}$ for all $i \in s(r)$ (since I is a finite set, these probabilities are strictly positive for all $i \in s(r)$). Then we can make $\Omega$ into an AW-summary using the Horvitz-Thompson (HT) estimator which provides for each $i \in s(r)$ the adjusted weight $$a(i) = \frac{w(i)}{Pr\{i \in s(r) \mid r \in \Omega\}}.$$

Items not in s(r) get adjusted weight 0. These adjusted weights are unbiased and have minimal variance for each item for the particular distribution $\Omega$ over subsets.

HT on a partitioned sample space (HTP) is a method to derive adjusted weights when we cannot determine $Pr\{i \in s(r) \mid s(r) \in \Omega\}$ from the sketch s(r) alone. For example if s(r) is a bottom-k sketch, then the probability $Pr\{i \in s(r) \mid r \in Q\}$ depends on all the weights w(i) for $i \in I$.

For each item i we partition $\Omega$ into subsets $P_1^i, P_2^i, \ldots$. This partition satisfies the following two conditions (1) Given a sketch s(r), we can determine the set $P_j^i$ containing r, and (2) For every set $P_j^i$ we can compute the conditional probability $p_j^i = Pr\{i \in s(r) \mid r \in P_j^i\}$.

For each $i \in s(r)$, we identify the set $P_j^i$ containing r and use the adjusted weight $a(i) = w(i)/p_j^i$ (which is the HT adjusted weight in $P_j^i$). In fact all we need is the probability $p_j^i$. In some cases we can compute it from some parameters of $P_j^i$, without identifying $P_j^i$ precisely. Items $i \notin s(r)$ get an adjusted weight of 0. The expected adjusted weight of each item i within each subspace of the partition is w(i) and therefore its expected adjusted weight over $\Omega$ is w(i).

Rank Conditioning (RC) adjusted weights for bottom-k sketches are HTP adjusted weights where the partition $P_1^i, \ldots, P_\ell^i$ which we use is based on rank conditioning. For each possible rank value r we have a set $P_r^i$ containing all rank assignments in which the k th rank assigned to an item other than i is r (If $i \in s(r)$ then this is the (k+1)st smallest rank and otherwise it's the k th smallest rank).

The probability that i is included in a bottom-k sketch given that the rank assignment is from $P_r^i$ is the probability that its rank value is smaller than r. For ws sketches, this probability is equal to $1-\exp(-w(i)r)$. Assume s(r) contains $i_1, \ldots, i_k$ and that the (k+1)st smallest rank is $r_{k+1}$. Then for item $i_1$, the rank assignment belongs to $P_{r_{k+1}}^{i_j}$, and therefore the adjusted weight of $i_j$ is $$\frac{w(i_j)}{1 - \exp(-w(i_j)r_{k+1})}.$$

The PRI RC adjusted weight for an item $i_j$ can be $\max\{w(i_j), 1/r_{k+1}\}$.

Lemma 17. Consider RC adjusted weights and two items i, j. Then, $cov[a(i), a(j)] = 0$ (The covariance of the adjusted weight of i and the adjusted weight of j is zero.)

This proof also extends to show that for any subset $J \subset I$, $E[\Pi_{i \in J} a(i)] = \Pi_{i \in J} w(i)$.

Corollary 2. For a subset $$J \subset I, \operatorname{var}[a(J)] = \sum_{j \in J} \operatorname{var}[a(j)].$$

Therefore, with RC adjusted weights, the variance of the weight estimate of a subpopulation is equal to the sum of the per-item variances, just like when items are selected independently. Corollary 2, combined with Szegedy's result, shows that when we have a choice of a family of rank functions, PRI weights are the best rank functions to use when using RC adjusted weights.

Selecting a partition. The variance of the adjusted weight a(i) obtained using HTP depends on the particular partition in the following way.

Lemma 18. Consider two partitions of the sample space, such that one partition is a refinement of the other, and the AW-summaries obtained by applying HTP using these partitions. For each $i \in I$, the variance of a(i) using the coarser partition is at most that of the finer partition.

It follows from Lemma 18 that when applying HTP, it is desirable to use the coarsest partition for which we can compute the probability $p_j^i$ from the information in the sketch. In particular a partition that includes a single component minimizes the variance of a(i) (This is the HT estimator). The RC partition yields the same adjusted weights as conditioning on the rank values of all items in I, i, so it is in a sense also the finest partition we can work with. It turns out that when the total weight w(I) is available we can use a coarser partition.

When the total weight is available we can use HTP estimators defined using a coarser partition of the sample space than the one used by the RC estimator. The Prefix conditioning estimator computes the adjusted weight of item i by partitioning the sample space according to the sequence (prefix) of k−1 items with smallest ranks drawn from I, {i}. The subset conditioning estimator (SC) uses an even coarser partition defined by the unordered set of the first k−1 items that are different from i. By Lemma 18 subset conditioning is the best in terms of per-item variances. Another advantage of these estimators is that they do not need $r_{k+1}$ and thereby utilize one less sample. In this version we discuss only the SC estimator.

The SC estimator has the following two additional important properties. In contrast with RC, the adjusted weights of different items have negative covariances, and the covariances cancel out: the sum of the adjusted weights equals the total weight of the set. This implies that the variance of the estimator of a large subset is smaller than the sum of the variances of the individual items in the subset, and in particular, the variance of the estimator for the entire set is zero. We now define this estimator precisely.

For a set $s = \{i_1, i_2, \ldots, i_k\}$ and $l \geq 0$, we define $$f(s, l) = \int_{x=0}^{\infty} l \exp(-lx) \prod_{j \in s} (1 - \exp(-w(i_j)x)) \, dx. \quad (2)$$

This is the probability that a random rank assignment with exponential ranks for items in s, and for the items in a set X such that w(X)=l, assigns the |s| smallest ranks to the items in s and the (|s|+1)st smallest rank to an item from X. For exponential ranks, this probability depends only on w(X), and does not depend on how the weight of X is divided between items. This is a critical property that allows us to compute adjusted weights with subset conditioning.

Recall that for an item i, we use the subspace with all rank assignments in which among the items in I, {i}, the items in s, {i} have the (k−1)st smallest ranks. The probability, conditioned on this subspace, that item i is contained in the sketch is $$\frac{f(s, w(I, s))}{f(s, , \{i\}, w(I \ s))},$$

and so the adjusted weight assigned to i is $$a(i) = w(i) \frac{f(s, , \{i\}, w(I \ s))}{f(s, w(I, s))}.$$

The following lemma shows that SC estimate the entire set with zero variance.

Lemma 19. Let s be a ws sketch of I and let a(i) be SC adjusted weights. Then, $\Sigma_{i \in s} a(i) = w(I)$.

To verify the last equality, observe that $$\frac{w(i)}{w(i) + w(I, s)} f(s, , , \{i\}, w(I \ \{s \ \{i\}\}))$$

is the probability that the first $|s|-1$ items drawn from I are s, i and the $|s|$th item is i. These are disjoint events and their union is the event that the first $|s|$ items drawn from I are s. The probability of this union is $f(s, w(I, s))$.

Lemma 20. Consider SC adjusted weights of two items $i \neq j$. Then, $\text{cov}[a(i), a(j)] < 0$.

Lemma 21. Consider ws sketches of a weighted set $(I, w)$ and subpopulation $J \subset I$. The SC estimator for the weight of J has smaller variance than the RC estimator for the weight of J.

Proof By Lemma 17 the variance of the RC estimator for J is $\Sigma_{j \in J} \text{var}_{RC}[a(j)]$. So using Lemma 4 we obtain that $\Sigma_{j \in J} \text{var}_{SC}[a(j)]$ is no larger than the variance of the RC estimator for J. Finally since $$\text{var}_{SC}\left[\sum_{j \in J} a(j)\right] = \sum_{j \in J} \text{var}_{SC}[a(j)] + \sum_{i \neq j, i,j \in J} \text{cov}_{SC}[a(i), a(j)],$$

and Lemma 20 that implies that the second term is negative the lemma follows.

The adjusted weights can be computed by numerical integration. We propose (and implement) an alternative method based on a Markov chain that is faster and easier to implement. As used herein, the phrase Markov chain means a stochastic process in which, given the present state, future states are independent of the past states. The method converges to the SC adjusted weights as the number of steps grows. It can be used with any fixed number of steps and can provide unbiased adjusted weights.

As an intermediate step we define a new estimator as follows. We partition the rank assignments into subspaces, each consisting of all rank assignments with the same ordered set of k items of smallest ranks Let P be a subspace in the partition. For each rank assignment in P and item i the adjusted weight of i is the expectation of the RC adjusted weight of i over all rank assignments in P. Note that this is not an instance of HTP; we simply average another estimator in each part.

These adjusted weights are unbiased because the underlying RC adjusted weights are unbiased. By the convexity of the variance, they have smaller per-item variance than RC.

By Lemma 16 the distribution of $r_{k+1}$ in each subspace P is the sum of k independent exponential random variables with parameters $w(I)$, $w(I) - w(i_1)$, ..., $w(I) - \Sigma_{h=1}^{k} w(i_h)$ where $i_1, \ldots, i_k$ are the items of k smallest ranks in rank assignments of P. So the adjusted weight of $i_j$, $j=1, \ldots, k$ is $a(i_j) = E[w(i_j)/(1-\exp(-w(i_j)r_{k+1}))]$ where the expectation is over this distribution of $r_{k+1}$.

Instead of computing the expectation, we average the RC adjusted weights $w(i_j)/(1-\exp(-w(i_j)r_{k+1}))$ over multiple draws of $r_{k+1}$. This average is clearly an unbiased estimator of $w(i_j)$ and its variance decreases with the number of draws. Each repetition can be implemented in $O(k)$ time (drawing and summing k random variables.).

We define a Markov chain over permutations of the k items $\{i_1, \ldots, i_k\}$. Starting with a permutation $\pi$ we continue to a permutation $\pi'$ by applying the following process. We draw $r_{k+1}$ as described above from the distribution of $r_{k+1}$ in the subspace corresponding to $\pi$. We then redraw rank values for the items $(i_1, \ldots, i_k)$ using their weights and $r_{k+1}$. The permutation $\pi'$ is obtained by reordering $(i_1, \ldots, i_k)$ according to the new rank values. This Markov chain has the following property.

Lemma 22. Let P be a (unordered) set of k items. Let $p_\pi$ be the conditional probability that in a random rank assignment whose prefix consists of items of P, the order of these items in the prefix is as in $\pi$. Then $p_\pi$ is the stationary distribution of the Markov chain described above.

Our implementation is controlled by two parameters inperm and permnum. inperm is the number of times the rank value $r_{k+1}$ is redrawn for a permutation $\pi$ (at each step of the Markov chain). permnum is the number of steps of the Markov chain (number of permutations in the sequence).

We start with the permutation $(i_1, \ldots, i_k)$ obtained in the ws sketch. We apply this Markov chain to obtain a sequence of permnum permutations of $\{i_1, \ldots, i_k\}$. For each permutation $\pi_j$, $1 \leq j \leq$ permnum we draw $r_{k+1}$ from $P_{\pi_j}$ inperm times as described above. For each such draw we compute the RC adjusted weights for all items. The final adjusted weight is the average of the RC adjusted weights assigned to the item in the permnum*inperm applications of the RC method. The total running time is $O(\text{permnum} \cdot k \log k + \text{inperm} \cdot k)$.

The expectation of the RC adjusted weights over the stationary distribution is the subset conditioning adjusted weight. An important property of this process is that if we apply it for a fixed number of steps, and average over a fixed number of draws of $r_{k+1}$ within each step, we still obtain unbiased estimators. Our experiments showed that these estimators performed very well.

The subset conditioning estimator has powerful properties. Unfortunately, it seems specific to ws sketches. Certain exemplary subset conditioning algorithms, given a weighted set $(H, w)$ of $k-1$ weighted items, an item i with weight $w(i)$, and a weight $l > 0$, can compute the probability that the bottom-k sketch of a set I that includes H, $\{i\}$ and has total weight $l + w(H) + w(i)$ contains the items $H \cup \{i\}$. This probability is determined from the distribution of the smallest rank of items with total weight l. In general, however, this probability depends on the weight distribution of the items in $I$, $\{H \cup \{i\}\}$. The exponential distribution has the property that the distribution of the smallest rank depends only on l and not on the weight distribution.

We first show a general derivation of confidence intervals for bottom-k sketches. Then we specialize the derivation to ws sketches and show that for ws sketches we can also compute the confidence intervals efficiently. We present the derivation of confidence intervals for selected subpopulation when the total weight is not known. We can use the same techniques in a more subtle way to derive tighter confidence intervals for subpopulations when the total weight is known.

Let r be a rank assignment of a weighted set $Z = (H, w)$. Recall that for $H' \subset H$, $r(H')$ is the minimum rank of an item in $H'$. Certain exemplary embodiments denote by $\bar{r}(H')$ the maximum rank of an item in $H'$. We define $r(\emptyset) = +\infty$ and $\bar{r}(\emptyset) = 0$.

For a distribution D over a totally ordered set (by $\prec$) and $0<\alpha<1$, we denote by $Q_\alpha(D)$ the $\alpha$-quantile of D. That is, $pr_{\gamma \in D}\{\gamma \prec Q_\alpha(D)\} \leq \alpha$
and $pr_{\gamma \in D}\{\gamma \preceq Q_\alpha(D)\} \geq 1-\alpha$.

A weighted list $(H,w,\pi)$ consists of a weighted set $(H,w)$ and a linear order (permutation) $\pi$ on the elements of H. We will find it convenient to sometimes specify the permutation $\pi$ as the order induced by a rank assignment r on H.

The concatenation $(H^{(1)},w^{(1)},\pi^{(1)}) \oplus (H^{(2)},w^{(2)},\pi^{(2)})$ of two weighted lists, is a weighted list with items $H^{(1)} \cup H^{(2)}$, corresponding weights as defined by $w^{(i)}:H^{(i)}$ and order such that each $H^{(i)}$ is ordered according to $\pi^{(i)}$ and the elements of $H^{(1)}$ precede those of $H^{(2)}$. Let $\Omega((H,w,\pi))$ be the probability subspace of rank assignments over $(H,w)$ such that the rank order is according to $\pi$.

Let r be a rank assignment, s be the corresponding sketch, and l be the weighted list $l=(J \cap s,w,r)$. Let $\overline{W}(l,r_{k+1},\delta)$ be the set of all weighted lists $h=(H,w',\pi)$ such that $$pr\{r'(H) \geq r_{k+1} | r' \in \Omega(l \oplus h)\} \geq \delta.$$

Let $\overline{w}(l,r_{k+1},\delta) = \sup\{w'(H) | (H,w',\pi) \in \overline{W}(l,r_{k+1},\delta)\}$. (If $\overline{W}(l,r_{k+1},\delta) = \emptyset$, then $\overline{w}(l,r_{k+1},\delta)=0$. If unbounded, then $\overline{w}(l,r_{k+1},\delta)=+\infty$.) Let $\underline{W}(l,r_k,\delta)$ be the set of all weighted lists $h=(H,w',\pi)$ such that $$pr\{r'(J \cap s) \leq r_k | r' \in \Omega(l \oplus h)\} \geq \delta.$$

Let $\underline{w}(l,r_k,\delta) = \inf\{w'(H) | (H,w',\pi) \in \underline{W}(l,r_k,\delta).$ (If $\underline{W}(l,r_k,\delta) = \emptyset,$ then $\underline{w}(l,r_k,\delta)=+\infty$). We prove the following.

Lemma 23. Let r be a rank assignment, s be the corresponding sketch, and l be the weighted list $l=(J \cap s,w,r)$. Then $w(J \cap s) + \overline{w}(l,r_{k+1},\delta)$ is a $(1-\delta)$-confidence upper bound on $w(J)$ and $w(J \cap s)+\underline{w}(l,r_k,\delta)$ is a $(1-\delta)$-confidence lower bound on $w(J)$. As used herein, the phrase upper bound means a top threshold of a confidence interval. As used herein, the phrase lower bound means a bottom threshold of a confidence interval. As used herein, Proof The bounds are conditioned on the subspace of rank assignments over $(I,w)$ where the ranks of items in I, J are fixed and the order of the ranks of the items in J is fixed. These subspaces are a partition of the sample space of rank assignments over $(I,w)$. We show that the confidence bounds hold within each subspace.

Consider such a subspace $\Phi = \Phi(J,\pi:J,\alpha:(I,J))$, where $\pi:J$ is a permutation over J, representing the order of the ranks of the items in J. and $\alpha:(I,J)$ are the rank values of the elements in I, J.

Let $D_{k+1}$ be the distribution of $r_{k+1}$ for $r \in \Phi$ and let $D_k$ be the distribution of $r_k$ for $r \in \Phi$. Over rank assignments in $\Phi$ we have $pr\{r_{k+1} \leq Q_{1-\delta}(D_{k+1})\} \geq 1-\delta$ and $pr\{r_k \geq Q_\delta(D_k)\} \geq 1-\delta$. Note that these distributions have some discrete values with positive probabilities, therefore, it does not necessarily holds that $pr\{r_k \leq Q_\delta(D_k)\} \leq \delta$ and $pr\{r_{k+1} \geq Q_{1-\delta}(D_{k+1})\} \leq \delta$. We show that:

the upper bound is correct for rank assignments $r \in \Phi$ such that $r_{k+1} \leq Q_{1-\delta}(D_{k+1})$. Therefore, it is correct with probability at least $(1-\delta)$; and the lower bound is correct for rank assignments $r \in \Phi$ such that $r_{k+1} \leq Q_\delta(D_k)$. Therefore, it is correct with probability at least $(1-\delta)$.

Consider a rank assignment $r \in \Phi$. Let s be the items in the sketch. Let $l=(J \cap s,w,r)$ and $l^{(c)}=(J,s,w,r)$ be the weighted lists of the items in $J \cap s$ or J, s, respectively, as ordered by r. There is bijection between rank assignments in $\Omega(l \oplus l^{(c)})$ and rank assignments in $\Phi$ by augmenting the rank assignments in $\Omega(l \oplus l^{(c)})$ with the ranks $a(j)$ for items $j \in I, J$. For a rank assignment $r \in \Phi$ let $\hat{r} \in \Omega(l \oplus l^{(c)})$ be its restriction to J.

A rank assignment $r' \in \Phi$ has $r'_{k+1} \geq r_{k+1}$ if and only if $\vec{r'}(J,s) \geq r_{k+1}$. Note that the statement with strict inequalities does not necessarily hold. So if $r \in \Phi$ such that $r_{k+1} \leq Q_{1-\delta}(D_{k+1})$ then $$pr_{r' \in \Omega(l \oplus l^{(c)})}\{\vec{r'}(J,s) \geq r_{k+1}\} = $$
$$pr_{r' \in \Phi}\{r'_{k+1} \geq r_{k+1}\} \geq pr_{r' \in \Phi}\{r'_{k+1} \geq Q_{1-\delta}(D_{k+1})\} \geq \delta.$$

Therefore, $l^{(c)} \in \overline{W}(l,r_{k+1},\delta)$ and hence $w(J,s) \leq \overline{w}(l,r_{k+1},\delta)$ and the upper bounds holds.

A rank assignment $r' \in \Phi$ has $r'_k \leq r_k$ if and only if the maximum rank that $\vec{r'}$ gives to an item in $J \cap s$ is $\leq r_k$. So if $r \in \Phi$ such that $r_k \geq Q_\delta(D_k)$ $$pr_{r' \in \Omega(l \oplus l^{(c)})}\{\vec{r'}(J \cap s) \leq r_k\} = pr_{r' \in \Phi}\{r'_k \leq r_k\} \geq pr_{r' \in \Phi}\{r'_k \leq Q_\delta(D_k)\} \geq \delta$$

Therefore, $l^{(c)} \in \underline{W}(l,r_k,\delta)$ and hence $w(J,s) \geq \underline{w}(l,r_k,\delta)$ and the lower bound holds.

The WSR estimator is the average the k minimum ranks which are independent exponential random variables with (the same) parameter $w(I)$. We used the normal approximation to this distribution in order to compute WSR confidence bounds.

For $0 \leq s_0 \leq \ldots \leq s_h < t$, we use the notation $v(t, s_0, \ldots, s_h)$ for the random variable that is the sum of h+1 independent exponential random variables with parameters $t-s_j$ ($j=0, \ldots, h$). From linearity of expectation, $$E[v(t, s_0, \ldots, s_h)] = \sum_{j=0}^{h} 1/(t-s_j).$$

From independence, the variance is the sum of variances of the exponential random variables and is $$\text{var}[v(t, s_0, \ldots, s_h)] = \sum_{j=0}^{h} 1/(t-s_j)^2.$$

Consider a weighted set $(I, w)$ and a subspace of rank assignments where the ordered set of the h items of smallest ranks is $i_1, i_2, \ldots, i_h$. Let $s_j = \sum_{l=1}^{j} w(i_l)$. For convenience we define $s_0 = 0$ and $r_0 = 0$. By Lemma 16, for $j=0, \ldots, h$, the rank difference $r(i_{j+1}) - r(i_j)$ is an exponential random variable ("r.v.") with parameter $w(I) - s_j$. These rank differences are independent. Therefore for $j \in \{0, \ldots, h\}$, the distribution of $r(i_j)$ (also the sum of the first i rank differences) is $v(w(I), s_0, \ldots, s_{j-1})$ in the subspace that we conditioned on.

Let J be a subpopulation. For a rank assignment, let s be the corresponding sketch and let $s_h$ ($1 \leq h \leq |J \cap s|$) be the sum of the weights of the h items of smallest rank values from J (we define $s_0 = 0$). Specializing Lemma 23 to ws sketches we obtain that the $(1-\delta)$-confidence upper bound on $w(J)$ is the solution of the equation $$pr\{v(x, s_0, \ldots, s_{|J \cap s|}) \leq r_{k+1}\} 1-\delta$$

(and is $s_{|J \cap s|}$ if there is no solution $x > s_{|J \cap s|}$). The $(1-\delta)$-confidence lower bound is 0 if $|J \cap s| = 0$. Otherwise, let $x > s_{|J \cap s|-1}$ be the solution of $$pr\{v(x, s_0, \ldots, s_{|J \cap s|-1}) \leq r_k\} = \delta.$$

The lower bound is $\max\{s_{|J \cap s|}, x\}$ if there is a solution and is $s_{|J \cap s|}$ otherwise.

To solve these equations, we either used the normal approximation to the respective sum of exponentials distribution or the quantile method which we developed.

Certain exemplary embodiments can apply the normal approximation to the quantiles of a sum of exponentials distribution. For $\delta \sqsupset 0.5$, let $\alpha$ be the Z-value that corresponds to confidence level $1-\delta$. The approximate $\delta$-quantile of $v(x, s_0, \ldots, s_h)$ is $E[v(x, s_0, \ldots, s_h)] - \alpha\sqrt{var[v(x,s_0,\ldots,s_h)]}$ and the approximate $(1-\delta)$-quantile is $E[v(x, s_0, \ldots, s_h)] + \alpha\sqrt{var[v(x,s_0,\ldots,s_h)]}$.

To approximately solve $pr\{v(x, s_0, \ldots, s_h) \leq \tau\} = \delta$ ($x$ such that $\tau$ is the $\delta$-quantile of $v(x, s_0, \ldots, s_h)$), we solve the equation $$E[v(x, s_0, \ldots, s_h)] - \alpha\sqrt{var[v(x,s_0,\ldots,s_h)]} = \tau.$$

To approximately solving $pr\{v(x, s_0, \ldots, s_h) \leq \tau\} = 1-\delta$, we solve $$E[v(x, s_0, \ldots, s_h)] + \alpha\sqrt{var[v(x,s_0,\ldots,s_h)]} = \tau.$$

We solve these equations (to the desired approximation level) by searching over values of $x > s_h$ using standard numerical methods. The function $E[v(x)] + \alpha\sqrt{var[v(x)]}$ is monotonic decreasing in the range $x > s_h$. The function $E[v(x)] - \alpha\sqrt{var[v(x)]}$ is decreasing or bitonic (first increasing then decreasing) depending on the value of $\alpha$.

Certain exemplary embodiments can solve the equations via a quantile method. Let $D^{(x)}$ be a parametric family of probability spaces such that there is a total order $\prec$ over the union of the domains of $\{D^{(x)}\}$. Let $\tau$ be a value in the union of the domains of $\{D^{(x)}\}$ such that the probability $pr\{\gamma \circ |\gamma \in D^{(x)}\}$ is increasing with $x$. So the solution $(x)$ to the equation $pr\{\gamma \circ \tau | \gamma \in D^{(x)}\} = \delta$ ($Q_\delta(D^{(x)}) = \tau$) is unique. (We refer to this property as monotonicity of $\{D^{(x)}\}$ with respect to $\tau$.)

We assume the following two "black box" ingredients. The first ingredient is drawing independent monotone parametric samples $s(x) \in D^{(x)}$. That is, for any $x$, $s(x)$ is a sample from $D^{(x)}$ and if $x \geq y$ then $s(x) \circ s(y)$. Two different parametric samples are independent: That is for every $x$, $s^1(x)$ and $s^2(x)$ are independent draws from $D^{(x)}$. The second ingredient is a solver of equations of the form $s(x) = \tau$ for a parametric sample $s(x)$.

We define a distribution $\overline{D}^{(\tau)}$ such that a sample from $\overline{D}^{(\tau)}$ is obtained by drawing a parametric sample $s(x)$ and returning the solution of $s(x) = \tau$. The two black box ingredients allow us to draw samples from $\overline{D}^{(\tau)}$. Our interest in $\overline{D}^{(\tau)}$ is due to the following property:

Lemma 24. For any $\delta$, the solution of $Q_\delta(D^{(x)}) = \tau$ is the $\delta$-quantile of $\overline{D}^{(\tau)}$.

The quantile method for approximately solving equations of the form $Pr\{\gamma \circ \tau | \gamma \in D^{(x)}\} = \delta$ draws multiple samples from $\overline{D}^{(\tau)}$ and returns the $\delta$-quantile of the set of samples.

We apply the quantile method to approximately solve Equations of the form $$pr\{v(x, s_0, \ldots, s_h) \leq \tau\} = \delta \quad (3)$$

(as an alternative to the normal approximation). The family of distributions that we consider is $D^{(x)} = v(x, s_0, \ldots, s_h)$. This family has the monotonicity property with respect to any $\tau > 0$. A parametric sample $s(x)$ from $v(x, s_0, \ldots, s_h)$ is obtained by drawing $h+1$ independent random variables $v_0, \ldots, v_h$ from $U[0,1]$. The parametric sample is $s(x) = \Sigma_{j=0}^{h} -\ln v_j/(x-s_j)$ and is a monotone decreasing function of $x$. A sample from $\overline{D}^{(\tau)}$ is then the solution of the equation $\Sigma_{j=0}^{h} -\ln v_j/(x-s_j) = \tau$. Since $s(x)$ is monotone, the solution can be found using standard search.

Certain exemplary embodiments can utilize confidence bounds for PRI sketches. We denote $p_\tau(i) = pr\{r(i) < \tau\}$. The number of items in $J \cap s$ with $p_\tau(i) < 1$ is used to bound $\Sigma_{i \in J | p_\tau(i) < 1} p_\tau(i)$ (the expectation of the sum of independent Poisson trials). As used herein, the phrase independent Poisson trials means a set of discrete tests that have a covariance of approximately zero and are distributed according to a probability distribution defined by the equation $$p(k; \lambda) = \frac{\lambda^k e^{-\lambda}}{k!},$$

where $k$ is a non-negative integer and $\lambda$ is an expected count of occurrences in an interval. These bounds are then used to obtain bounds on the weight $\Sigma_{i \in J | p_\tau(i) < 1} w(i)$, exploiting the correspondence (specific for PRI sketches) between $\Sigma_{i \in J | p_\tau(i) < 1} p_\tau(i)$ and $\Sigma_{i \in J | p_\tau(i) < 1} w(i)$, for PRI sketches $p_\tau(i) = \min\{1, w(i)\tau\}$. If $w(i)\tau \geq 1$ then $p_\tau(i) = 1$ (item is included in the sketch) and if $w(i)\tau < 1$ then $p_\tau(i) = w(i)\tau$. Therefore, $p_\tau(i) < 1$ if and only if $p_\tau(i) = w(i)\tau$ and $$\sum_{i \in J | p_\tau(i) < 1} w(i) = \tau^{-1} \sum_{i \in J | p_\tau(i) < 1} p_\tau(i).$$

For $n' \geq 0$, define $\overline{n}_\delta(n')$ (respectively, $\underline{n}_\delta(n')$) to be the infimum (respectively, supremum) over all $\mu$, such that for all sets of independent Poisson trials with sum of expectations $\mu$, the sum is less than $\delta$ likely to be at most $n'$ (respectively, at least $n'$). If $n' = |\{i \in J \cap s | w(i)\tau < 1\}|$, then $\underline{n}_{67}(n')$ and $\overline{n}_{67}(n')$ are $(1-\delta)$-confidence bounds on $\Sigma_{i \in J | p_\tau(i) < 1} p_\tau(i)$. Since $$w(J) = \sum_{i \in J \cap s | w(i)\tau \geq 1} w(i) + \tau^{-1} \sum_{i \in J \cap s | w(i)\tau < 1} p_\tau(i),$$

we obtain $(1-\delta)$-confidence upper and lower bounds on $w(J)$ by substituting $\overline{n}_\delta(J)$ and $\underline{n}_{67}(J)$ for $\Sigma_{i \in J | p_\tau(i) < 1} p_\tau(i)$ in this formula, respectively.

Chernoff bounds provide an upper bound on $\overline{n}_\delta(n')$ of $-\ln \delta$ if $n' = 0$ and the solution of $\exp(n'-x)(x/n')^{n'} = \delta$ otherwise; and a lower bound on $\underline{n}_\delta(n') \leq n'$ that is the solution of $\exp(n'-x)(x/n')^{n'} = \delta$ and 0 if there is no solution.

Certain exemplary embodiments can utilize and/or consider three sources of slack in the bounds. The first is the use of Chernoff bounds rather than exactly computing $\overline{n}_\delta(n')$ and $\underline{n}_\delta(n')$. The other two sources of slack are due to the fact that the actual distribution of the sum of independent Poisson trials depends not only on the sum of their expectations but also on how they are distributed (variance is higher when there are more items with smaller $p_i$'s). The second slack is that these bounds make "worst case" assumptions on the distribution of the items. The third slack is that the derivation of the bounds does not use the weights of the items in $J \cap s$ with $w(i)\tau < 1$ that we see in the sketch.

Our evaluation included synthetic dataset distributions that allowed us to understand performance dependence on the skew (Pareto power parameter) and real-world datasets that provided natural selection predicates for subpopulations:

Datasets were obtained by independently drawing $n \in \{1 \times 10^3, 2 \times 10^4\}$ items from each of uniform or Pareto distributions with power parameters $\alpha \in \{1, 1.2, 2\}$. We select subpopulations (a partition into subpopulation), using a group size parameter g. Items are ordered by their weights and sequentially partitioned into n/g groups (subpopulations) each consisting of g items. This partition corresponds to subpopulations of similar-size items.

Netflix Prize dataset contains approximately $1 \times 10^8$ dated ratings of 17,770 movies by users. As used herein, the phrase user means a person, organization, process, device, program, protocol, and/or system that uses a device, system, process, and/or service. Each movie corresponds to a record with weight equal to the number of ratings. We used a natural grouping of movies into subpopulations according to ranges of movie release years (same year, 2 years, 5 years, and decades).

Two IP packet traces of $4.2 \times 10^9$ packets (campus) and $4.7 \times 10^9$ packets (peering). Items corresponded to destination IP address and application (determined by port and protocol) pairs (7593 and 41217 distinct items). As used herein, the phrase port means a data connection in an information device and/or networking device to which a peripheral device or a transmission line from a remote terminal and/or remote system can be attached. As used herein, As used herein, the phrase system means a collection of mechanisms, devices, machines, articles of manufacture, processes, data, and/or instructions, the collection designed to perform one or more specific functions. The weight of each item was the total bytes of associated packets. We used natural partition into subpopulations, based on the application type (such as web, mail, p2p, and more). As used herein, the phrase type means a number of things having in common traits or characteristics that distinguish them as a group or class.

We compared estimators and confidence bounds on the total weight w(I).

Estimators. We evaluated the maximum likelihood ws estimator (ws ML), the rank conditioning ws estimator (ws RC), the rank conditioning PRI estimator (PRI RC), and the wsR estimator.

FIG. 1 is a block diagram of an exemplary embodiment of a set if graphs indicative of absolute relative errors in estimated parameters as a function of sketch size for exemplary k-min sketches and bottom-k sketches for various sketches. As used herein, the phrase k-min sketch means a summary of a set of items with positive weights obtained by, repeating k times, assigning independent random ranks to items where the distribution used for each item depends on the weight of the item and taking the item with minimum rank value. The illustrated estimators have been averaged over 1000 repetitions.

Figure 2:
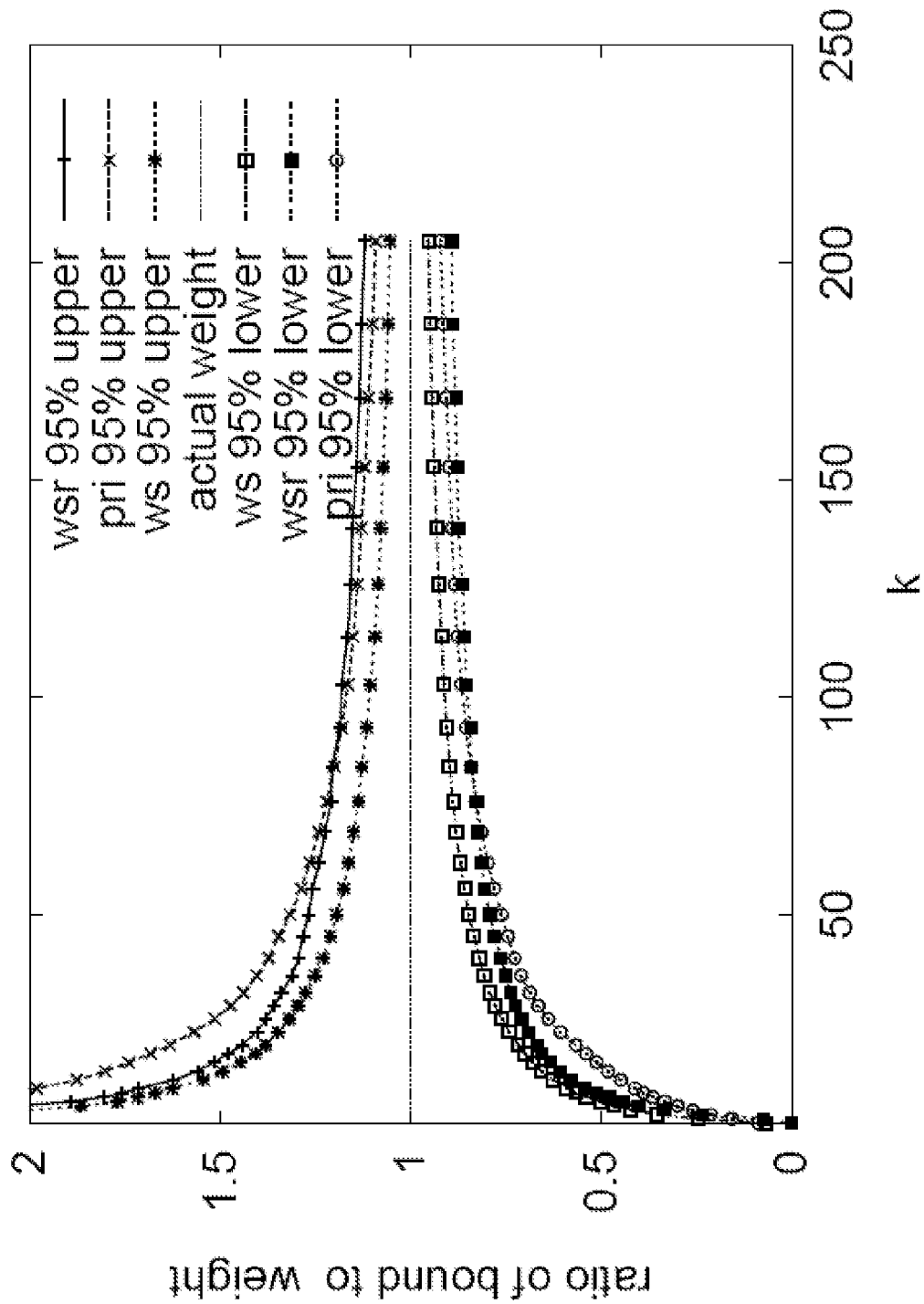
FIG. 2 is a block diagram of an exemplary embodiment of a set if graphs indicative of ratios of bound to weight for various sketches as a function of sketch size for various sketches.

FIG. 2 is a block diagram of an exemplary embodiment of a set if graphs indicative of ratios of bound to weight for various sketches as a function of sketch size for various sketches. The curves illustrate 95% confidence upper and lower bounds for estimating w(I).

Figure 3:
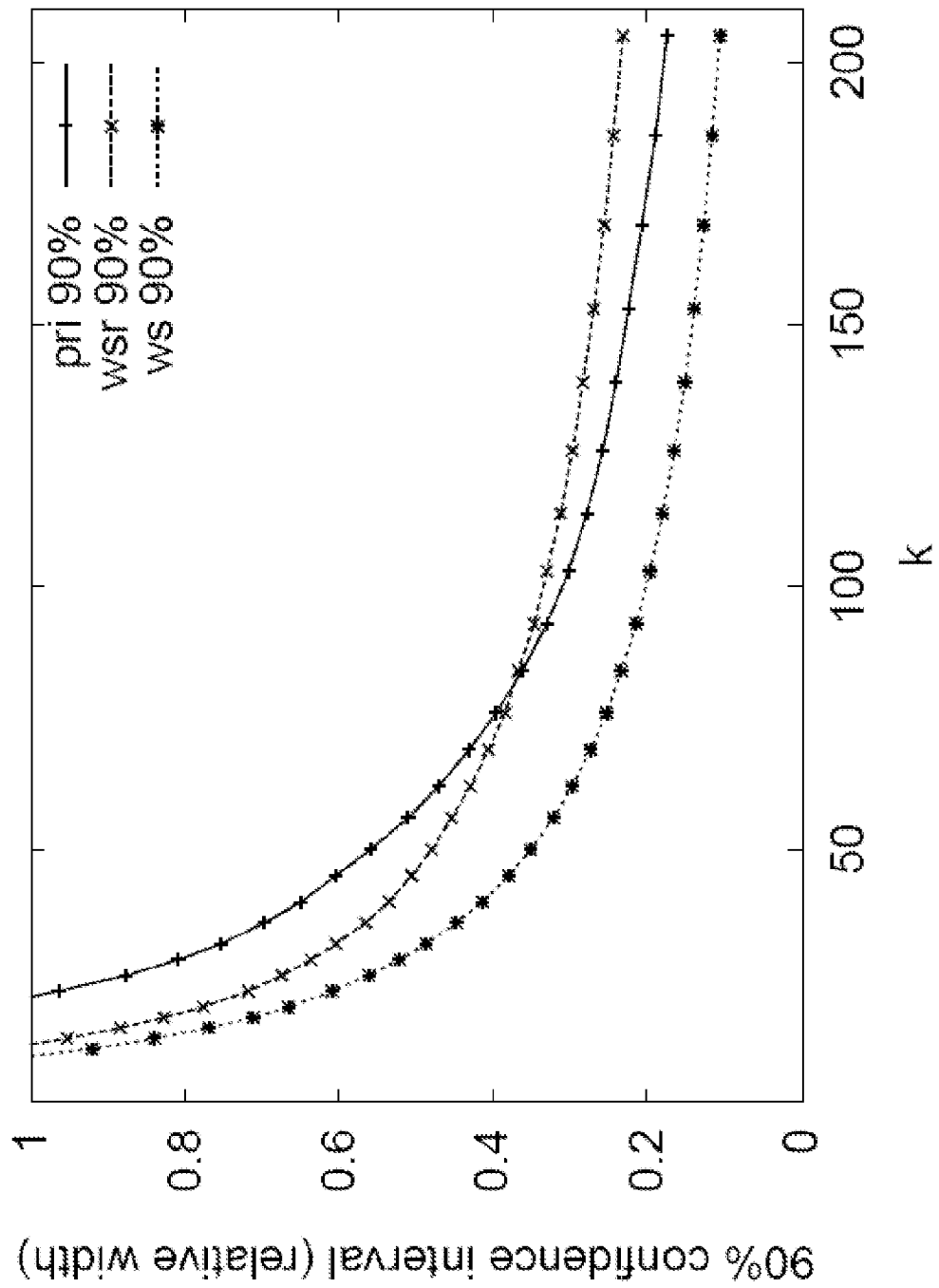
FIG. 3 is a block diagram of an exemplary embodiment of a set if graphs indicative of confidence interval widths as a function of sketch size for various sketches.

FIG. 3 is a block diagram of an exemplary embodiment of a set if graphs indicative of confidence interval widths as a function of sketch size for various sketches. The curves illustrated are indicative of a width of a 90% confidence interval for estimating w(I).

Figure 4:
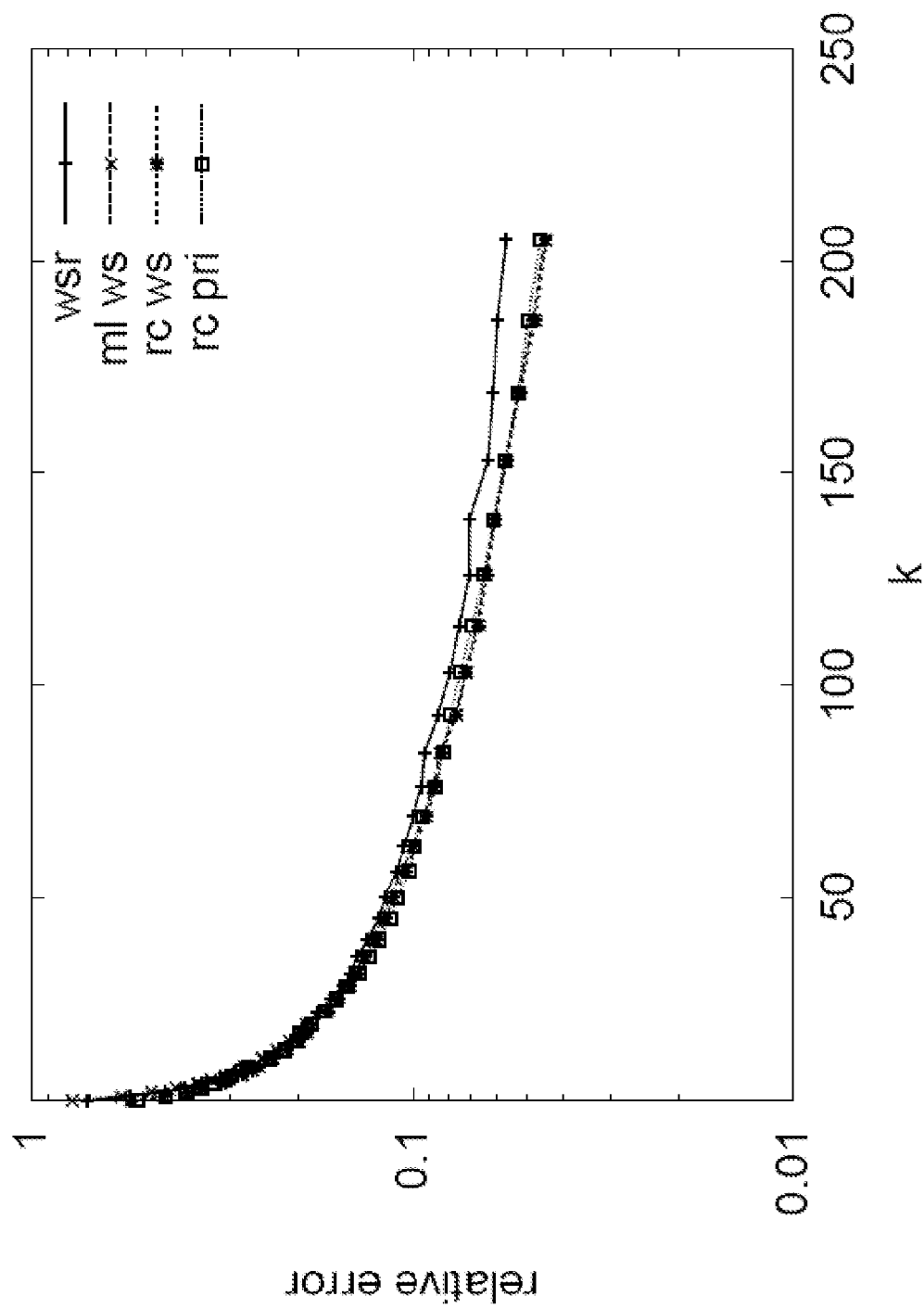
FIG. 4 is a block diagram of an exemplary embodiment of a set if graphs indicative of relative errors in estimated parameters as a function of sketch size for various sketches.

FIG. 4 is a block diagram of an exemplary embodiment of a set if graphs indicative of relative errors in estimated parameters as a function of sketch size for various sketches. The illustrated estimators have been averaged over 1000 repetitions.

Figure 5:
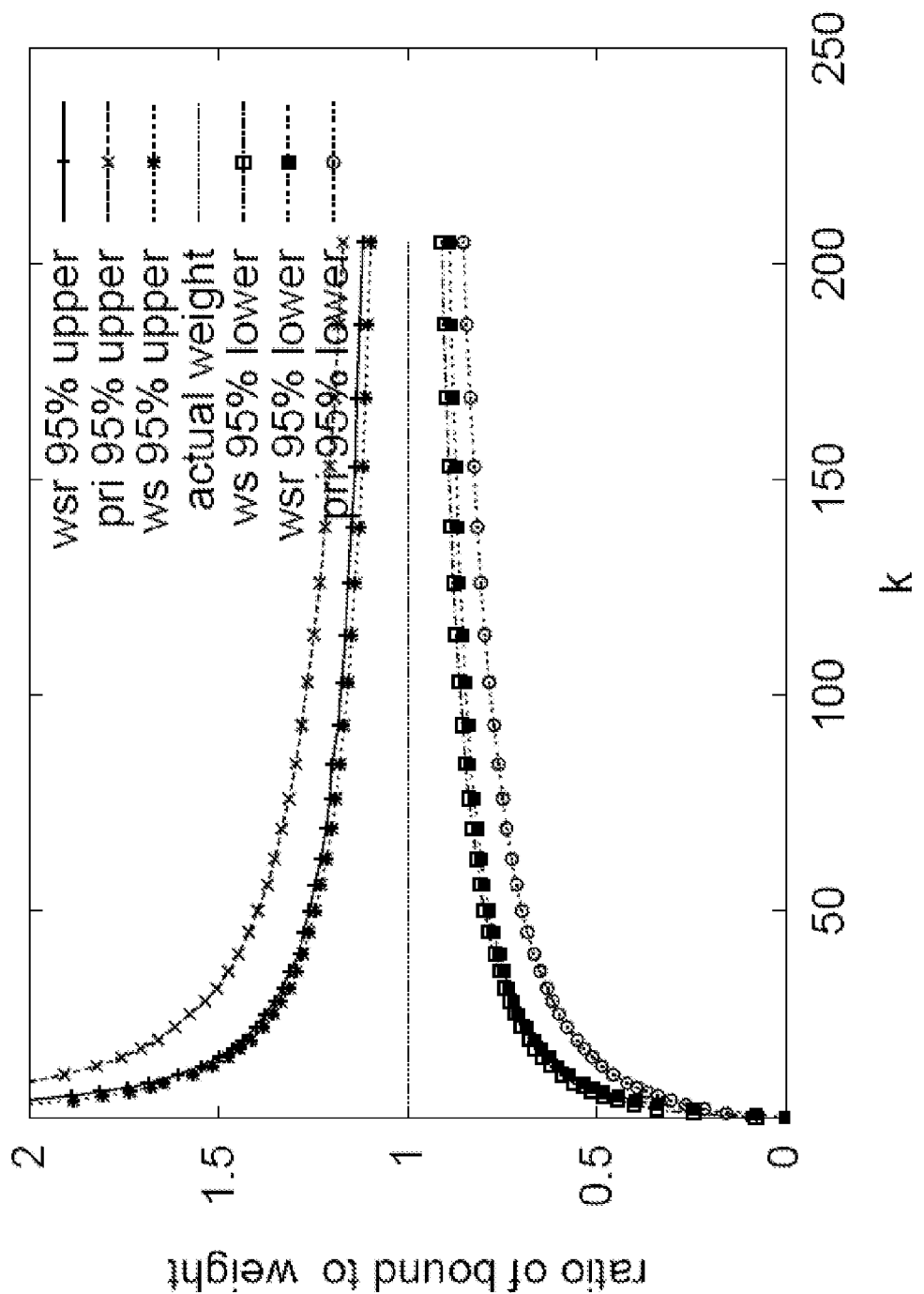
FIG. 5 is a block diagram of an exemplary embodiment of a set if graphs indicative of ratios of bound to weight for various sketches as a function of sketch size for various sketches.

FIG. 5 is a block diagram of an exemplary embodiment of a set if graphs indicative of ratios of bound to weight for various sketches as a function of sketch size for various sketches. The curves illustrate 95% confidence upper and lower bounds for estimating w(I).

Figure 6:
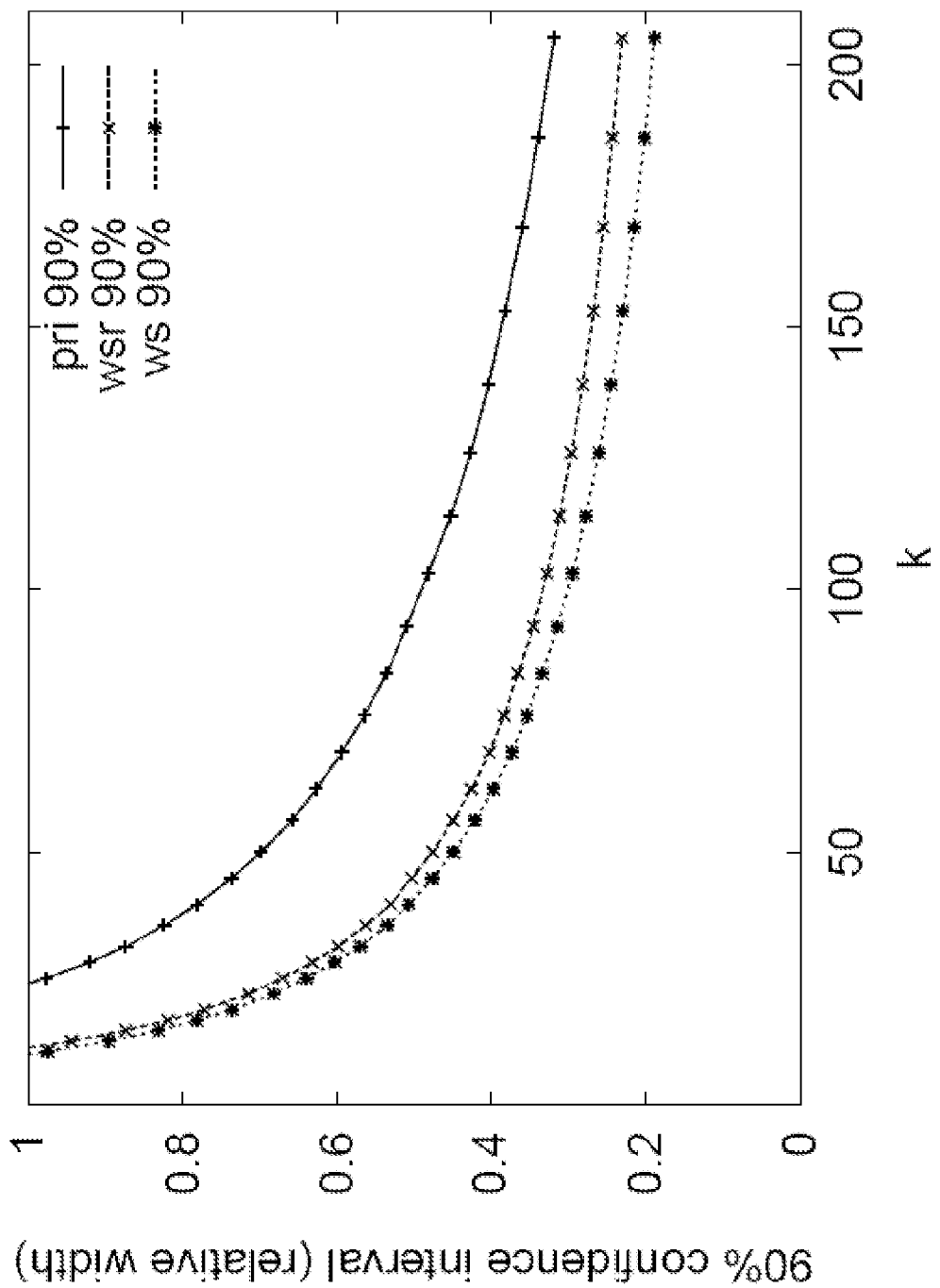
FIG. 6 is a block diagram of an exemplary embodiment of a set if graphs indicative of confidence interval widths as a function of sketch size for various sketches.

FIG. 6 is a block diagram of an exemplary embodiment of a set if graphs indicative of confidence interval widths as a function of sketch size for various sketches. The curves illustrated are indicative of a width of a 90% confidence interval for estimating w(I).

FIGS. 1-6 shows the (absolute value) of the relative error, averaged over 1000 runs, as a function of k. We can see that all three bottom-k based estimators outperform the wsR estimator, demonstrating the advantage of the added information when sampling "without replacement" over sampling "with replacement". The advantage of these estimators grows with the skew. The quality of the estimate is similar among the bottom-k estimators (ws ML, ws RC, and PRI RC). The maximum likelihood estimator (ws ML), which is biased, has worse performance for very small values of k where the bias is more significant. PRI RC has a slight advantage especially if the distribution is more skewed. This is because, in this setting, with unknown w(I), PRI RC is a nearly optimal adjusted-weight based estimator.

Confidence bounds. We compared the Chernoff based PRI confidence bounds and the ws and wsR confidence bounds we derived. We apply the normal approximation with the stricter (but easier to compute) conditioning on the order for the ws confidence bounds and the normal approximation for the wsR confidence bounds. The 95%-confidence upper and lower bounds and the 90% confidence interval (the width, which is the difference between the upper and lower bounds), averaged over 1000 runs, are shown in FIG. 6 (middle and right). We can see that the ws confidence bounds are tighter, and often significantly so, than the PRI confidence bounds. In fact PRI confidence bounds were worse than the wsR-based bounds on less-skewed distributions (including the uniform distributions). This perhaps surprising behavior is explained by the large slack between the bounds and the actual variance of the (nearly-optimal) PRI RC estimator.

The normal approximation provided fairly accurate confidence bounds for the total weight. The ws and wsR bounds were evidently more efficient, with real error rate that closely corresponded to the desired confidence level. E.g., for the 90% confidence interval on all Pareto distributions, across values of k, the highest error rate was 12%. The true weight was within the ws confidence bounds on average in 90.5%, 90.2%, and 90% of the time for the different values of $\alpha$. The corresponding in-bounds rates for wsR were 90.6%, 90.3%, and 90.0%, and for PRI 99.2%, 99.1%, and 98.9%. (The high in-bounds rate for the PRI bounds reflects the slack in these bounds).

Estimators. We implemented an approximate version of ws SC using the Markov chain and averaging method. We showed that this approximation provides unbiased estimators that are better than the plain ws RC estimator (better per-item variances and negative covariances for different items), but attains zero sum of covariances only at the limit. We quantified this improvement of ws SC over ws RC and its dependence on the size of the subpopulation. We evaluated the quality of approximate ws SC as a function of the parameters INPERM, and PERMNUM, and we compared ws SC to the PRI RC estimator.

It is always possible to design AW-summaries that artificially favor a particular subpopulation. Therefore, to obtain a meaningful comparison, we consider all subpopulations defined by a partition of the items. For such a partition, we compute the sum, over subpopulations, of the square error of the estimator (square of the difference between the adjusted weight and the true weight of the subpopulation), averaged over multiple runs. This sum corresponds to the sum of the variances of the estimator over the subpopulations. We considered parameterized partitions by the group size g for the Pareto distributions. For the Netflix data, we partitioned the movies according to ranges of release years. For the IP packets data, we used a fixed partition according to application type of the IP flow.

To evaluate how the quality of the estimators varies with subpopulation size, we sweep the parameter g for the Pareto distributions. The RC estimators have zero covariances, and therefore, the sum of square errors should remain constant when sweeping g. The WS SC estimator has negative covariances and therefore we expect the sum to decrease as a function of g. For g=1, this sum corresponds to the sum of the variances of the items which should be the same for the WS estimators and smaller for the PRI estimator. The sum of square errors, as a function of g, is constant for the RC estimators, but decreases with the WS SC estimator. For g=n, we obtain the variance of the sum of the adjusted weights, which should be 0 for the WS SC estimator (but not for the approximate versions).

Figure 7:
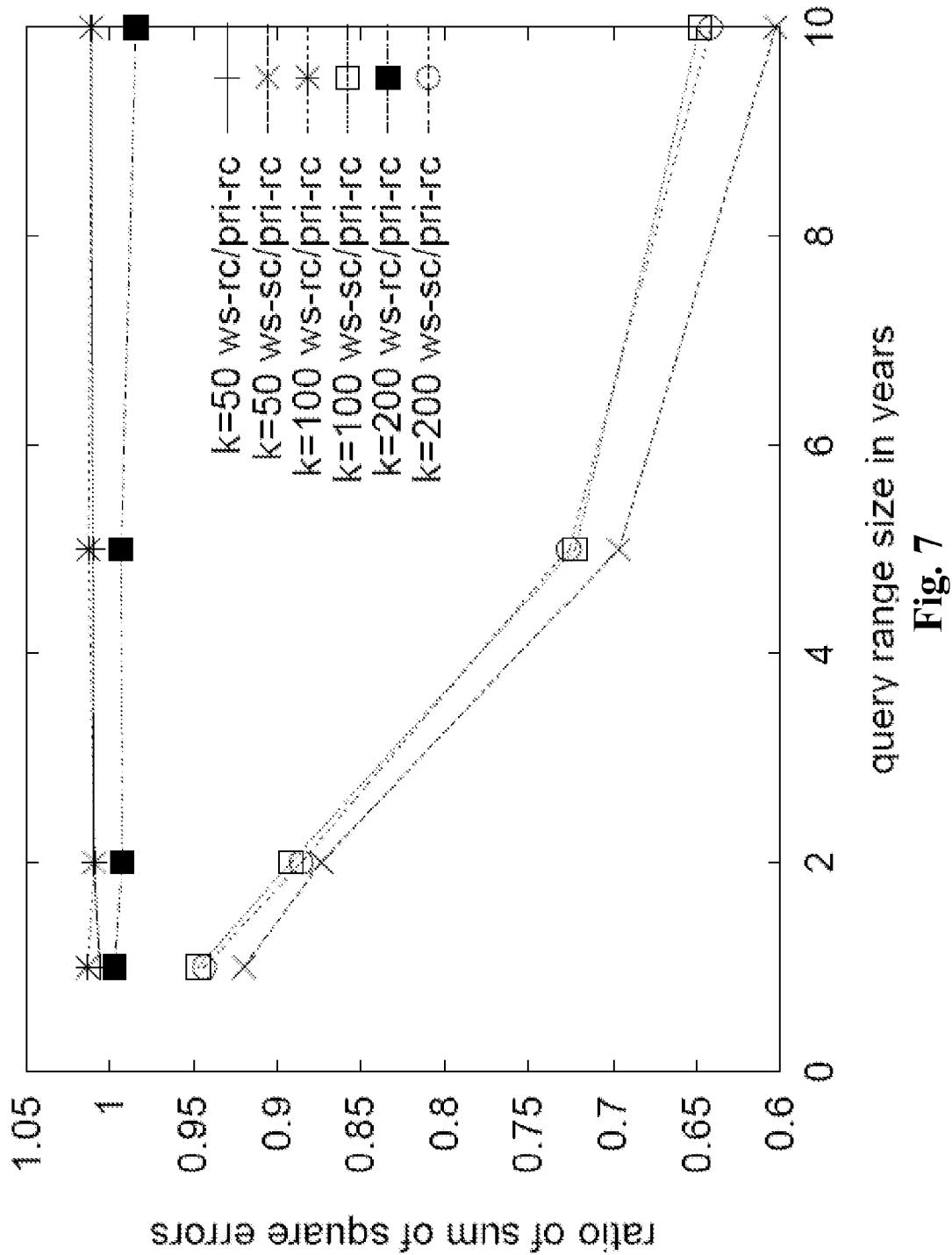
FIG. 7 is a block diagram of an exemplary embodiment of a set if graphs indicative of ratios of sum of square errors as a function of query range size for various sketches.
Figure 8:
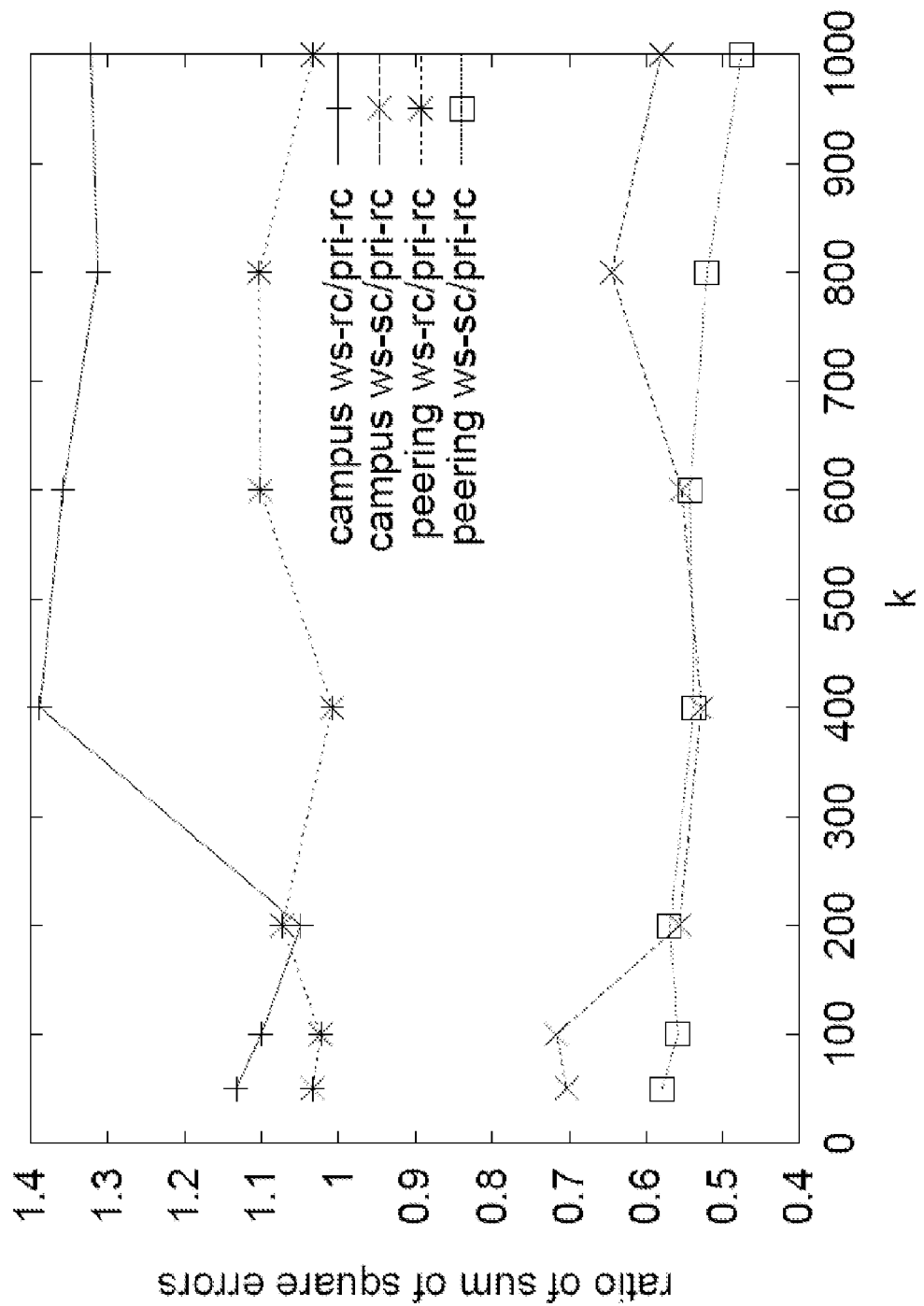
FIG. 8 is a block diagram of an exemplary embodiment of a set if graphs indicative of ratios of sum of square errors as a function of sketch size for various sketches.

Representative results are shown in FIGS. 7-8 (Pareto distributions) and in FIGS. 1-6 (the Netflix and IP packets datasets).

We observed that for g=1, the PRI RC estimator (that obtains the minimum sum of per-item variances by a sketch of size k+1) performs slightly better than the WS RC estimator when the data is more skewed (smaller $\alpha$). The performance of WS SC is close and better for small values of k (it uses one fewer sample). For g>1, the WS SC estimator outperforms both RC estimators and has significantly smaller variance for larger subpopulations. We similarly observe that on the Netflix and IP packet data, PRI RC was slightly better than WS RC and WS SC on smaller subpopulations and WS SC was significantly better than the RC estimators on larger subpopulations (25%-50% smaller variance).

FIG. 7 is a block diagram of an exemplary embodiment of a set if graphs indicative of ratios of sum of square errors as a function of query range size for various sketches.

FIG. 8 is a block diagram of an exemplary embodiment of a set if graphs indicative of ratios of sum of square errors as a function of sketch size for various sketches.

FIGS. 7-8 illustrate ratios of the sum of square errors (averaged over 200 repetitions) over a partition, of WS RC to PRI RC and of WS SC with inperm=20 and permnum=20 to PRI RC. FIG. 7 illustrates the netflix request stream, groupings corresponded to movies released in the same year or range of years (same year, 2 years, 5 years, and decade), we sweep the size of the range and show k=50,100,200. As used herein, the phrase request means (v.) to express a need and/or desire for; to inquire and/or ask for. (n.) that which communicates an expression of desire and/or that which is asked for. FIG. 8 illustrates IP packet streams, where items correspond to destination IP and application-type pairs. We sweep the summary size k.

We conclude that in applications when w(I) is provided, the WS SC estimator is a considerably better choice than the RC estimators. Our results also demonstrate that the metric of the sum of per-item variances, that PRI RC is nearly optimal with respect to it, is not a sufficient notion of optimality for subpopulation weight estimators. It can be augmented with comparison of covariances, making their sum as small as possible.

Figure 9:
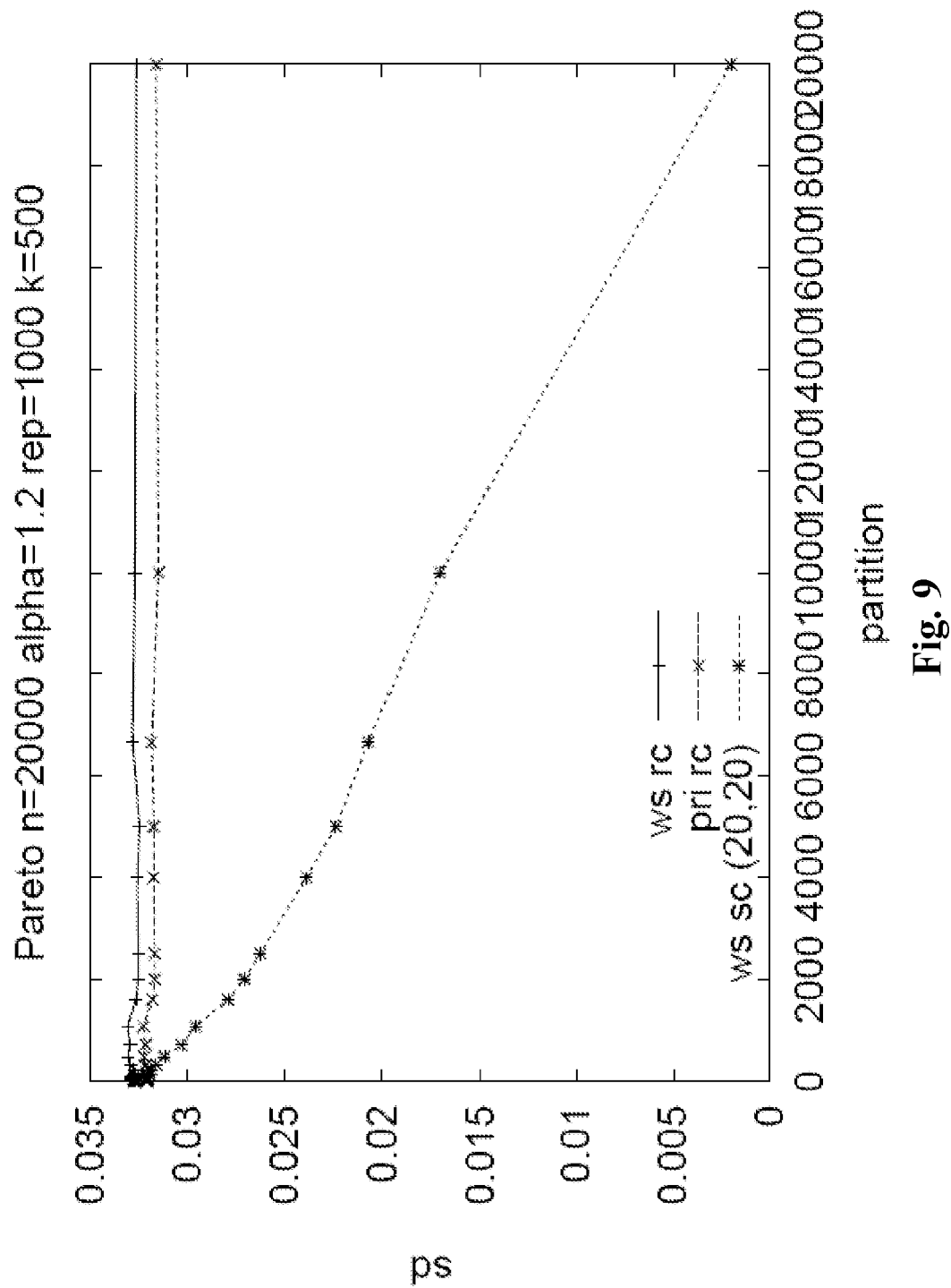
FIG. 9 is a block diagram of an exemplary embodiment of a set if graphs indicative of normalized sum of square errors as a function of partition size for various sketches.

FIG. 9 is a block diagram of an exemplary embodiment of a set if graphs indicative of normalized sum of square errors as a function of partition size for various sketches.

Figure 10:
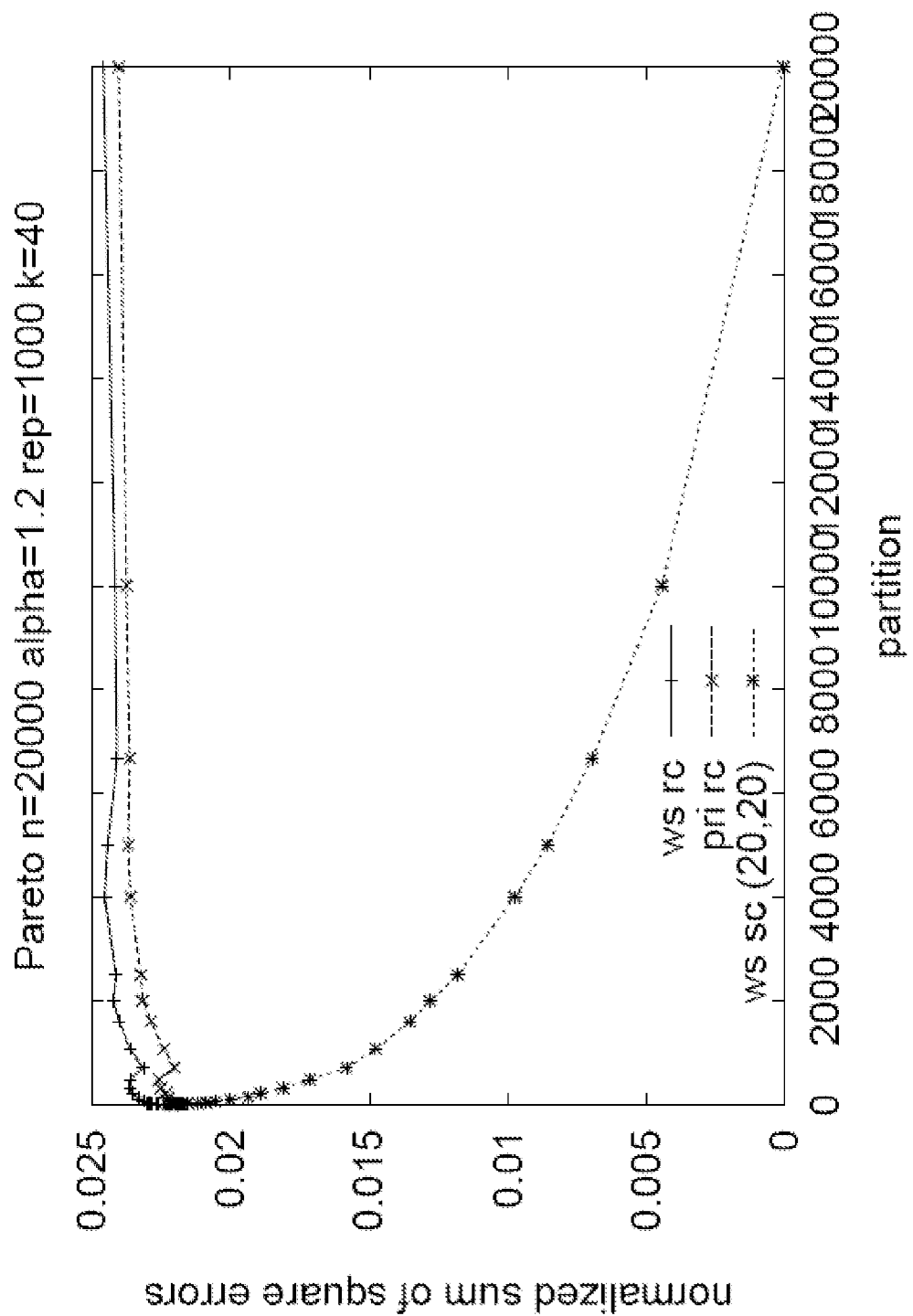
FIG. 10 is a block diagram of an exemplary embodiment of a set if graphs indicative of normalized sum of square errors as a function of partition size for various sketches.

FIG. 10 is a block diagram of an exemplary embodiment of a set if graphs indicative of normalized sum of square errors as a function of partition size for various sketches.

FIGS. 9-10 illustrate normalized sum of square errors (averaged over 1000 repetitions) over a partition as a function of group size for k=500 and k=40 and $\alpha$=1.2.

Figure 11:
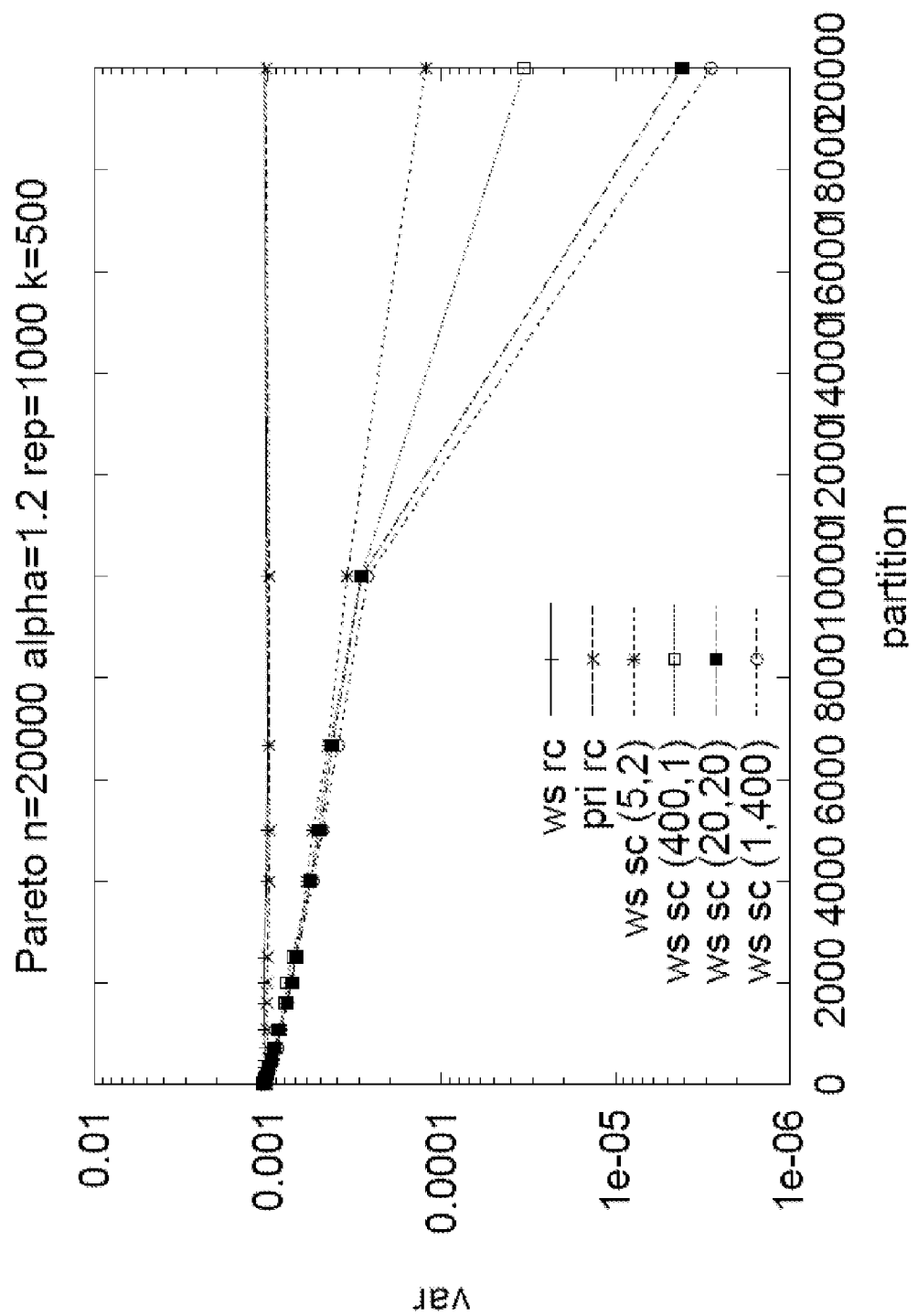
FIG. 11 is a block diagram of an exemplary embodiment of a set if graphs indicative of a variance as a function of partition size for various sketches.

FIG. 11 is a block diagram of an exemplary embodiment of a set if graphs indicative of a variance as a function of partition size for various sketches.

Figure 12:
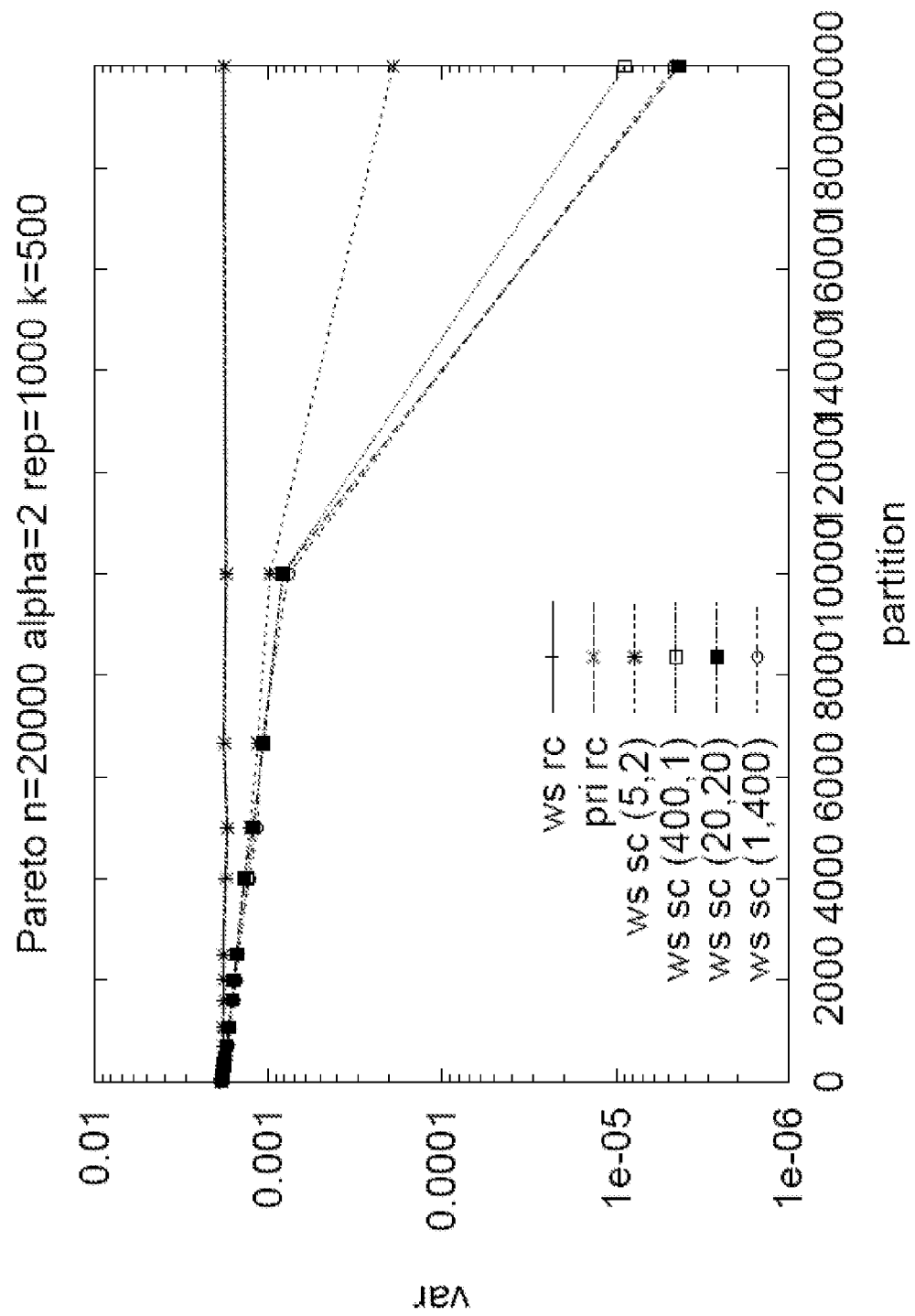
FIG. 12 is a block diagram of an exemplary embodiment of a set if graphs indicative of a variance as a function of partition size for various sketches.

FIG. 12 is a block diagram of an exemplary embodiment of a set if graphs indicative of a variance as a function of partition size for various sketches.

FIGS. 11-12 compare different choices of the parameters inperm, and permnum for the approximate (Markov chain based) WS SC estimator. We denote each such choice as a pair (inperm,permnum). We compare estimators with parameters (400,1), (20,20), (1,400), and (5,2). We conclude the following: (i) A lot of the benefit of WS SC on moderate-size subsets is obtained for small values: (5,2) performs nearly as well as the variants that use more steps and iterations. (ii) There is a considerable benefit of redrawing within a permutation: (400, 1) that iterates within a single permutation performs well. (iii) Larger subsets, however, benefit from larger PERMNUM: (1,400) performs better than (20,20) which in turn is better than (400,1). $\alpha$=1.2 $\alpha$=2.

FIGS. 11-12 illustrate a sum of variances in a partition for k=500 as a function of group size for different combinations of inperm and permnum.

Confidence bounds. We evaluate confidence bounds on subpopulation weight using the PRI Chernoff-based bounds (PRI), and the WS bounds that use w(I) (WS+w(I)) or do not use w(I) (WS−w(I)). The WS bounds are computed using the quantile method with 200 draws from the appropriate distribution.

We consider the relative and square error of the bounds and the width of the confidence interval. The confidence bounds, intervals, and square errors, were normalized using the weight of the corresponding subpopulation. For each distribution, value of k, and partition g, the normalized bounds were averaged across 500 repetitions and across all subpopulations. Across these distributions, the WS+w(I) confidence bounds are tighter (more so for larger g) than WS−w(I) and both are significantly tighter than the PRI confidence bounds. Representative results are shown in FIGS. 11-14).

Figure 13:
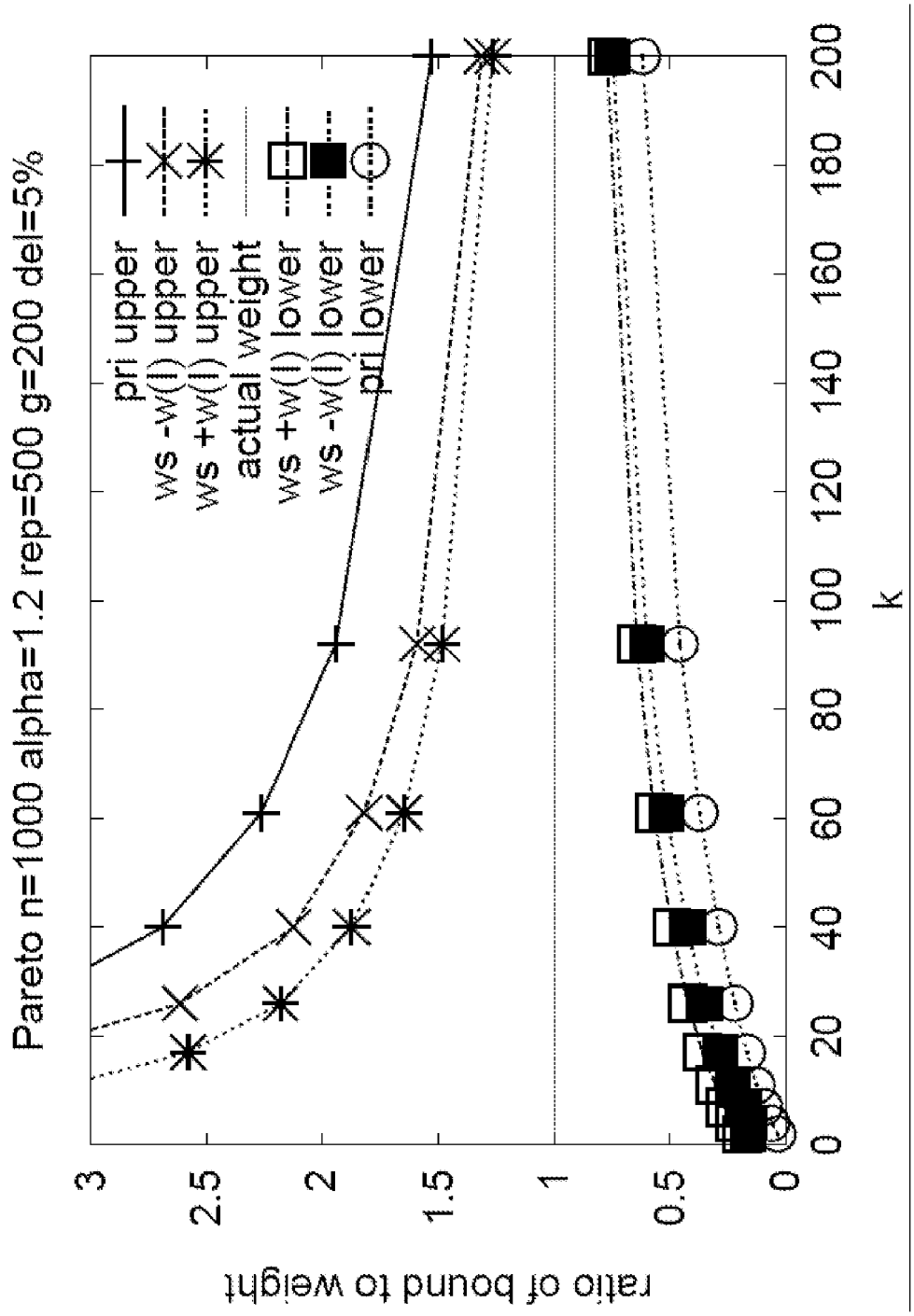
FIG. 13 is a block diagram of an exemplary embodiment of a set if graphs indicative of ratios of bound to weight as a function of sketch size for various sketches.

FIG. 13 is a block diagram of an exemplary embodiment of a set if graphs indicative of ratios of bound to weight as a function of sketch size for various sketches.

Figure 14:
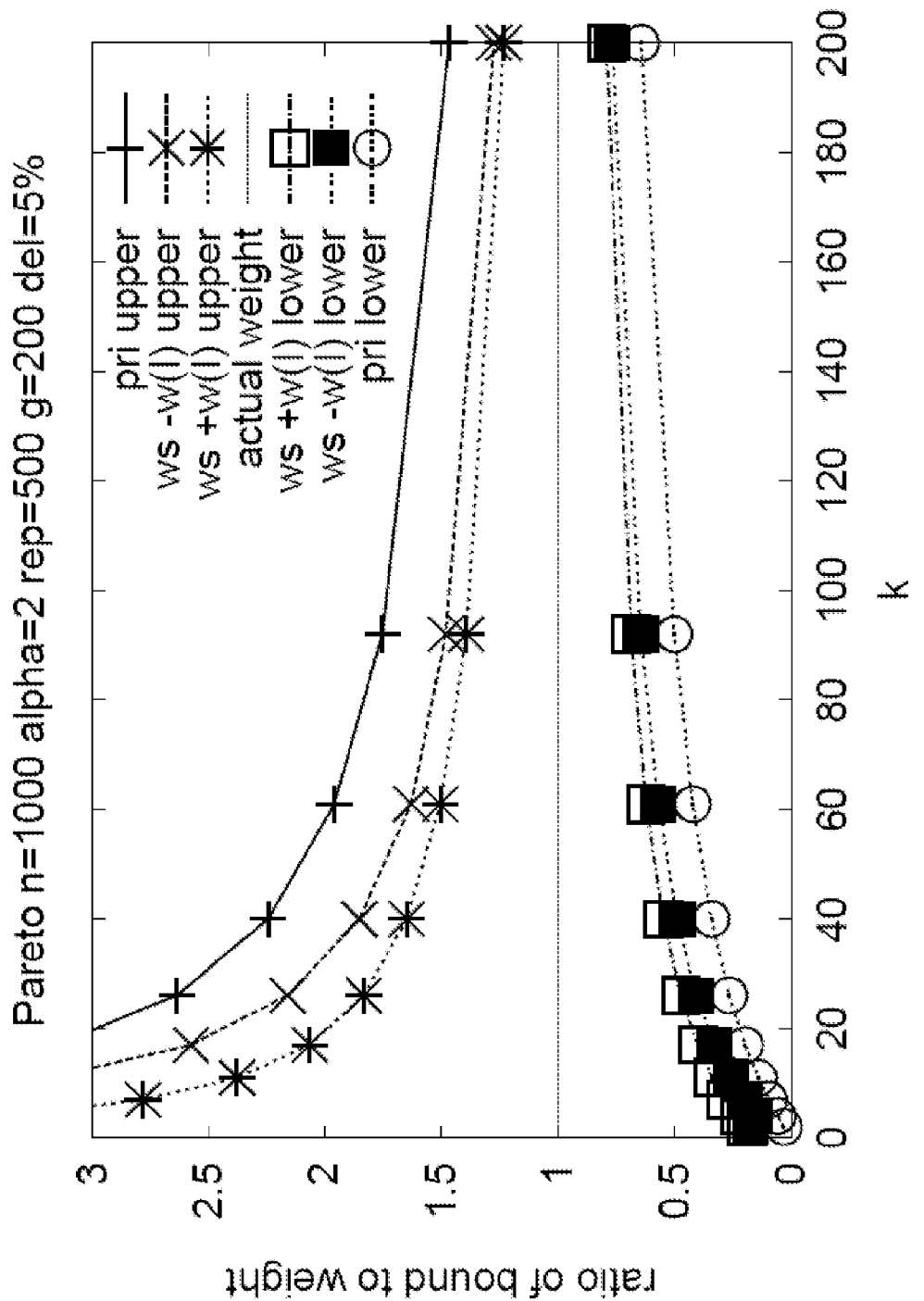
FIG. 14 is a block diagram of an exemplary embodiment of a set if graphs indicative of ratios of bound to weight as a function of sketch size for various sketches.

FIG. 14 is a block diagram of an exemplary embodiment of a set if graphs indicative of ratios of bound to weight as a function of sketch size for various sketches.

Figure 15:
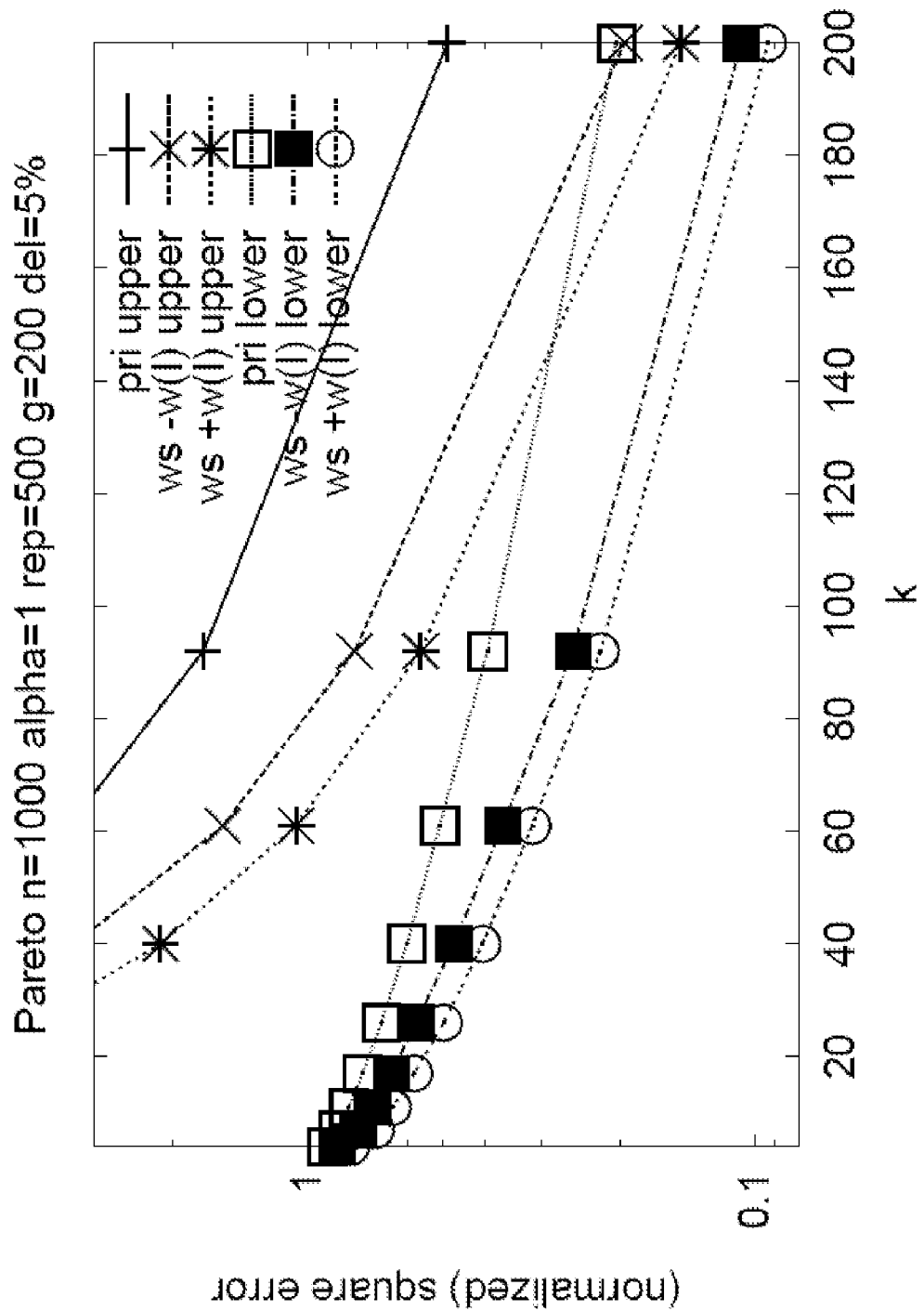
FIG. 15 is a block diagram of an exemplary embodiment of a set if graphs indicative of normalized squared errors as a function of sketch size for various sketches.

FIG. 15 is a block diagram of an exemplary embodiment of a set if graphs indicative of normalized squared errors as a function of sketch size for various sketches.

Figure 16:
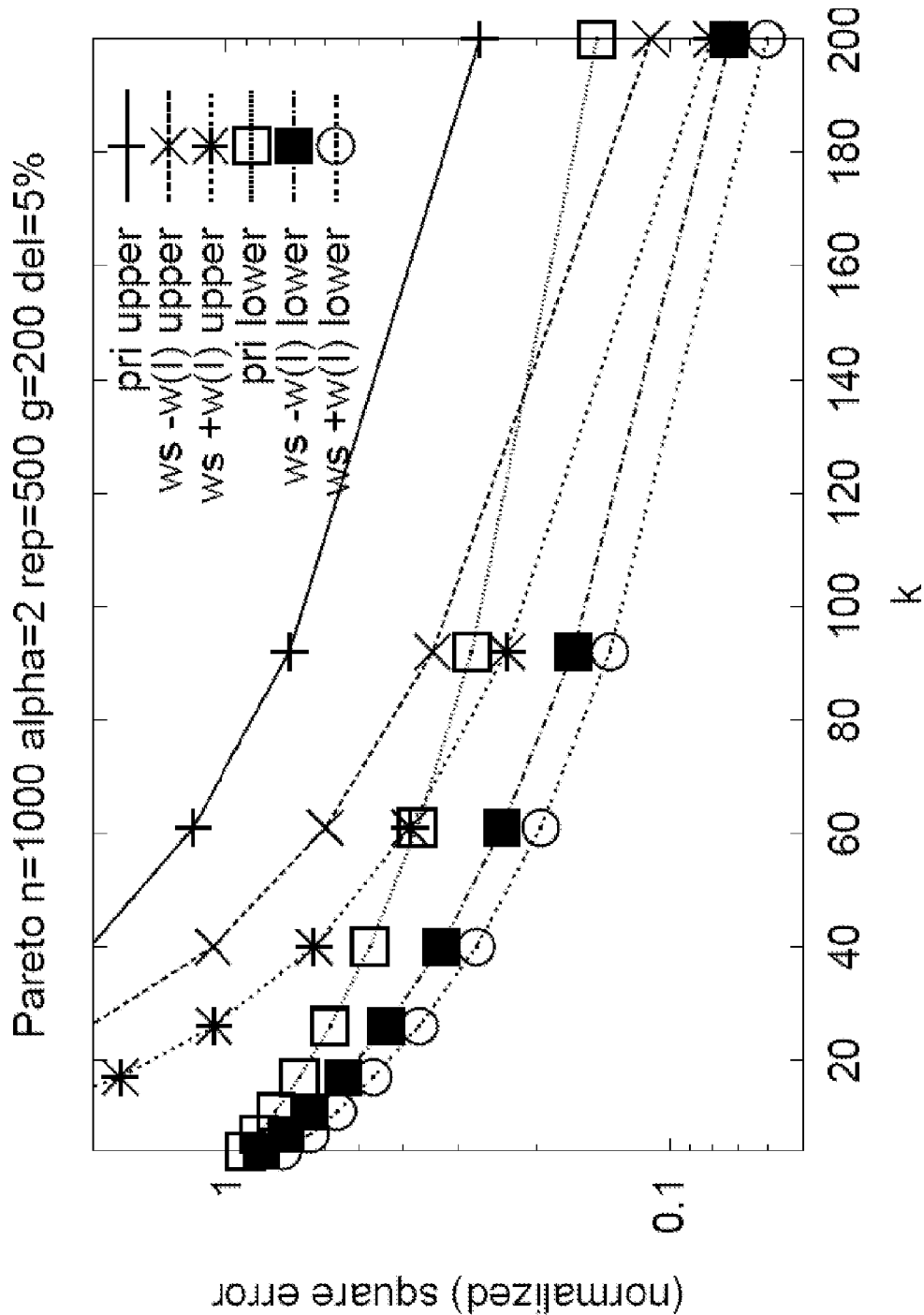
FIG. 16 is a block diagram of an exemplary embodiment of a set if graphs indicative of normalized squared errors as a function of sketch size for various sketches.

FIG. 16 is a block diagram of an exemplary embodiment of a set if graphs indicative of normalized squared errors as a function of sketch size for various sketches.

FIGS. 13-16. illustrate subpopulation 95% confidence bounds (top) and (normalized) squared error of the 95% confidence bounds (bottom) for g=200.

We consider a fundamental problem of summarization of datasets that supports subpopulation weight queries. We focus on the bottom-k summarization format, which can be computed efficiently for many representations of the data and efficiently captures coordinated and all-distances sketches, and is more informative than other sketching methods with these properties.

We derive novel and significantly tighter estimators and confidence bounds. Our derivations, which are based on basic principles, are complemented with the design of interesting and efficient computation methods, including a Markov chain based method to approximate the ws SC estimator, and the quantile method to compute the confidence bounds. We follow up with an experimental evaluation on synthetic and real-life datasets.

Figure 17:
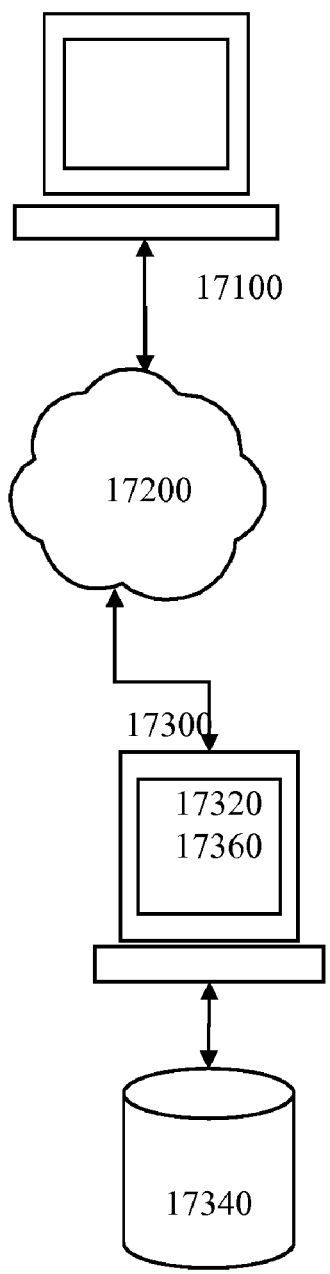
FIG. 17 is a block diagram of an exemplary embodiment of a system 17000.

FIG. 17 is a block diagram of an exemplary embodiment of a system 17000, which can comprise an information device 17100. As used herein, the phrase comprise means to include, but not be limited to, what follows. Information device 17100 can be communicatively coupled to a server 17300 via a network 17200. As used herein, the phrase couple means to join, connect, and/or link two things together. As used herein, the phrase network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. As used herein, the phrase memory device means an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

As used herein, the phrase router means a device adapted to direct traffic and/or determine the next network point to which a data packet should be forwarded enroute toward its destination. The router is connected to at least two networks and determines which way to send each data packet based on its current understanding of the state of the networks it is connected to. Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model. Flow records containing this information are collected at IP routers by tools such as Cisco's NetFlow (now emerging as an IETF standard). As used herein, the phrase collect means to accumulate and/or gather. Each flow record contains the number of packets and bytes of the flow. As used herein, the phrase packets means a collection of digital data comprised of information and an associated header transmitted over a packet-switching network.

Server 17300 can comprise and/or be communicatively coupled to a user program 17320, a user interface 17360, and a memory device 17340. As used herein, the phrase user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

As used herein, the phrase interface means (n) a boundary across which two independent systems meet and act on and/or communicate with each other; (v) to connect with and/or interact with by way of an interface. As used herein, the phrase memory device means an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein. Information device 17100 and/or server 17300 can be adapted to perform any method and/or activity described herein. As used herein, the phrase activity means an action, act, deed, function, step, and/or process and/or a portion thereof. In certain exemplary embodiments, user program 17320 can be adapted to analyze one or more datasets and/or derive one or more bottom-k sketches from a dataset. User interface 17360 can be adapted to render information regarding the dataset and/or a sketch derived therefrom.

Figure 18:
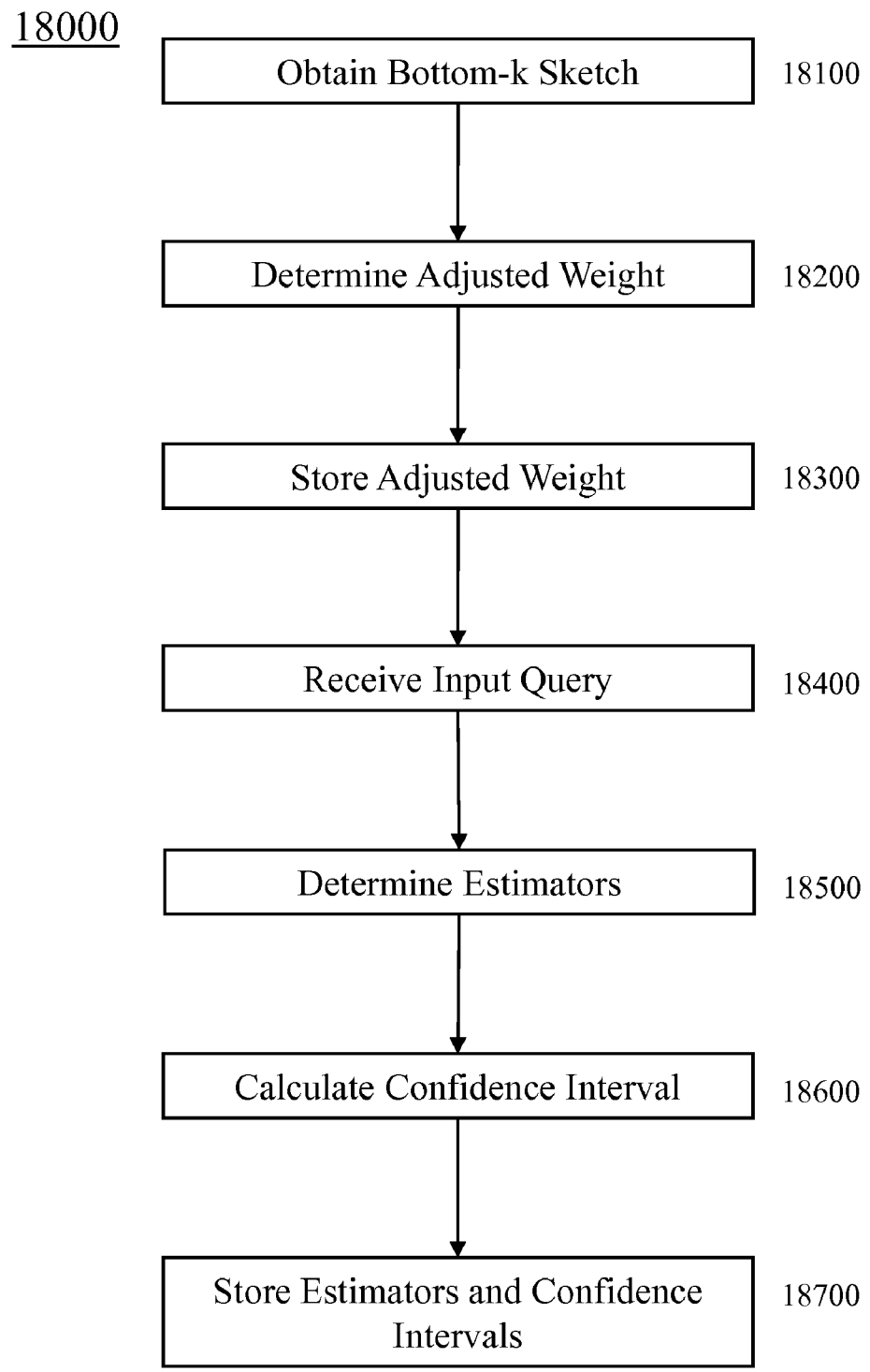
FIG. 18 is a flowchart of an exemplary embodiment of a method 18000.

FIG. 18 is a flowchart of an exemplary embodiment of a method 18000. As used herein, the phrase method means a process, procedure, and/or collection of related activities for accomplishing something. In certain exemplary embodiments, any activity and/or subset of activities of method 18000 can be performed automatically by an information device. As used herein, the phrase automatically means acting and/or operating in a manner essentially independent of external human influence and/or control. For example, an automatic light switch can turn on upon "seeing" a person in its view, without the person manually operating the light switch. As used herein, the phrase activity means an action, act, deed, function, step, and/or process and/or a portion thereof. As used herein, the phrase automatic means performed via an information device in a manner essentially independent of influence and/or control by a user. As used herein, the phrase automatically means acting and/or operating in a manner essentially independent of external human influence and/or control. For example, an automatic light switch can turn on upon "seeing" a person in its view, without the person manually operating the light switch.

In certain exemplary embodiments, one or more activities of method 18000 can be performed via machine-implementable instructions stored on a machine-readable medium. As used herein, the phrase machine-readable medium means a physical structure from which a machine, such as an information device, computer, microprocessor, and/or controller, etc., can obtain and/or store data, information, and/or instructions. Examples include memories, punch cards, and/or optically-readable forms, etc. As used herein, the phrase machine implementable instructions means directions adapted to cause a machine, such as an information device, to perform one or more particular activities, operations, and/or functions. As used herein, The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. As used herein, the phrase cause means to bring about, provoke, precipitate, produce, elicit, be the reason for, result in, and/or effect. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. As used herein, the phrase machine-readable medium means a physical structure from which a machine, such as an information device, computer, microprocessor, and/or controller, etc., can obtain and/or store data, information, and/or instructions. Examples include memories, punch cards, and/or optically-readable forms, etc. At activity 18100, a sketch such as a bottom-k sketch can be obtained. The sketch can be obtained via dataset sampling.

At activity 18200, adjusted weights of the sketch can be determined. In certain exemplary embodiments, adjusted weights can be automatically computed via a rank conditioning method. As used herein, the phrase rank conditioning method means an algorithm that assigns adjusted weights to items included in a bottom-k sketch of a dataset. The rank conditioning method can be adapted to determine a rank conditioning estimator. The rank conditioning estimator can have zero covariances between different records of the dataset. The adjusted weights are used for estimating the weight of subpopulations of the original dataset. The adjusted weights can be applied to items comprised in a bottom-k sketch. The adjusted weights can be adapted to be used to estimate a size of subpopulations of items. As used herein, the phrase adapted to means suitable, fit, and/or capable of performing a specified function. The bottom-k sketch can be derived from the all-distance bottom-k sketch. The weight of the dataset can be automatically calculated. An estimator of properties of the dataset can be manually and/or automatically determined based upon the weight. Certain exemplary can be adapted to automatically calculate a selectivity of a sub-population of the dataset. The selectivity can be one of the estimators. The selectivity can be based upon the computed adjusted weights.

Certain exemplary embodiments can be adapted to automatically compute an adjusted weight via a subset-conditioning method. The estimator of properties of the dataset can be based upon the adjusted weight. The subset-conditioning method can be adapted to compute a subset conditioning estimator. The subset conditioning estimator can have negative covariances between different records of the dataset. Certain exemplary embodiments can be adapted to, via a Markov-chain based method, compute an adjusted weight for items comprised in the all-distance bottom-k sketch. The all-distance bottom-k sketch can have exponentially distributed ranks and/or a known total weight. The estimator of properties of the dataset can be based upon the adjusted weight. A resemblance of two subsets can be automatically computed based on an application of estimators to a bottom-k sketch of a union of the two subsets. As used herein, the phrase resemblance means a quantitative measure of similarity. The estimator of properties of the dataset can be based upon the resemblance.

At activity 18300, the adjusted weight can be stored for reference and/or further processing. Certain exemplary embodiments can assign adjusted weights to items in the sketch. Certain exemplary embodiments can estimate the weight of a subpopulation of the dataset. The adjusted weights can be summed over items in the sketch that are members of the subpopulation. Once the sketch has been obtained and adjusted weights computed, the weight of a subpopulation can be estimated.

At activity 18400, an input query can be received. The input query can be a predicate specifying a subpopulation. Estimators and confidence intervals can be based upon a weight of the specified subpopulation.

At activity 18500, estimators can be determined. Once the bottom-k sketch (or all-distances bottom-k sketch, which can compactly encode bottom-k sketches of many neighborhoods) is computed, the bottom-k sketch can be used to estimate properties of the original dataset without actually having the original dataset (other forms of sampling a population can be used to estimate properties of the population). For example, to estimate election results, 1000 people out of the million can be sampled and statistics of the sample can be determined and/or used to estimate the results of the actual population. In certain exemplary embodiments, confidence intervals and/or confidence bounds can be determined.

The estimator can be based upon an all-distance bottom-k sketch of the dataset. As used herein, the phrase based upon means determined in consideration of and/or derived from. The estimator can be based upon computed adjusted weights of an all-distance bottom-k sketch of the dataset. As used herein, the phrase based upon means determined in consideration of and/or derived from. The adjusted weights can be unbiased. The estimators of the all-distance bottom-k sketch can be obtained automatically from corresponding determined estimators of the k-min sketch of the dataset. The estimators can have exponentially distributed ranks Certain exemplary embodiments can be adapted to automatically estimate a variance of an estimator. The estimator of properties can be based upon the variance. The estimators can comprise a Horvitz-Thompson estimator. As used herein, the phrase Horvitz-Thompson estimator means an unbiased parameter of a population total of a finite population, applicable in a general case where individuals are sampled with unequal probabilities.

Certain exemplary embodiments can be adapted to, based upon an all-distance bottom-k sketch of a predetermined subset of goods, automatically render an estimated cost to market the predetermined subset of goods to a predetermined subset of consumers. As used herein, the phrase goods means items that are purchased and/or sold. As used herein, the phrase consumer means a potential and/or actual purchaser of goods and/or services. As used herein, the phrase render means to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc. As used herein, the phrase haptic means involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, fraction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity. As used herein, the phrase consumer means a potential and/or actual purchaser of goods and/or services. The predetermined subset of goods can be one of a plurality of subsets of a set of goods. The predetermined subset of consumers can be one of a plurality of subsets of a set of consumers. Estimators of the all-distance bottom-k sketch can be obtained automatically from corresponding determined estimators of the k-min sketch of the dataset.

Certain exemplary embodiments can be adapted to, based upon an all-distance bottom-k sketch of a first dataset and an all-distance bottom-k sketch of a second dataset, automatically render an estimate of a size of a planned dataset to be stored on a memory device. As used herein, the phrase plan means to make prior arrangements for. The planned dataset can be a union of the first dataset and the second dataset. Estimators of the all-distance bottom-k sketch can be obtained automatically from corresponding determined estimators of a k-min sketch of the dataset.

Certain exemplary embodiments can be adapted to automatically prompt a network user to modify a network responsive to a determined estimator of properties of a dataset of flows through the network. As used herein, the phrase responsive means reacting to an influence and/or impetus. As used herein, the phrase prompt means to advise and/or remind. As used herein, the phrase prompt means to advise and/or remind. The estimator can be based upon an all-distance bottom-k sketch of the dataset. The properties can comprise automatically calculated confidence intervals of subpopulation-size estimators for the all-distance bottom-k sketch. Each of the confidence intervals can be associated with a corresponding application type flowing through the network. An upper bound and a lower bound of each confidence interval can be based upon an expectation of a sum of independent Poisson trials. As used herein, the phrase independent Poisson trials means a set of discrete tests that have a covariance of approximately zero and are distributed according to a probability distribution defined by the equation $$p(k; \lambda) = \frac{\lambda^k e^{-\lambda}}{k!},$$

where k is a non-negative integer and $\lambda$ is an expected count of occurrences in an interval.

Certain exemplary embodiments can be adapted to, based upon the computed adjusted weights, answering a subpopulation weight query of the dataset. Certain exemplary embodiments can be adapted to automatically determine a total weight of the dataset.

Certain exemplary embodiments can automatically estimate properties of flows through a router. The properties can be based upon computed adjusted weights of an all-distance bottom-k sketch of the flows. The adjusted weights can be computed via a Markov-chain based method. The adjusted weights can be applied to items comprised in a bottom-k sketch. The adjusted weights can be adapted to be used to estimate a size of subpopulations of items of the flows. The bottom-k sketch can be derived from the all-distance bottom-k sketch.

Certain exemplary embodiments can, via a processor, perform estimator of properties of a dataset from a computed sketch of the dataset. The sketch of the dataset can have a format of a bottom-k sketch or an all-distance bottom-k sketch. The estimator can be based upon computed adjusted weights to the items included in the sketch. In certain exemplary embodiments, the adjusted weights can be computed via a rank conditioning method. In certain exemplary embodiments, the adjusted weights can be computed via a subset conditioning method. In certain exemplary embodiments, the adjusted weights can be computed via a Markov-chain based method. The adjusted weights can be adapted to be used to estimate a size of subpopulations of items. The bottom-k sketch can be derived from the all-distance bottom-k sketch.

At activity 18600, a confidence interval for one or more estimators can be calculated. Certain exemplary embodiments can provide confidence bounds, which for a given confidence level can provide an upper bound and/or a lower bound of a selected estimator. Certain exemplary embodiments can be adapted to automatically calculate confidence intervals on subpopulation-size based upon the all-distance bottom-k sketch. The estimator of properties of the dataset based upon the confidence intervals.

At activity 18700, estimators and/or confidence intervals can be stored on a memory device. The estimators can be stored for reference and/or further processing. In certain exemplary embodiments, estimators determined for the k-min sketch can be applied to a bottom-k sketch and/or an all-distance bottom-k sketch. In certain exemplary embodiments, subpopulation queries can be made. For example, a sample of people, subpopulation can comprise information regarding gender, zipcode, racial and/or background, etc. Certain information can overlap. A predicate can specify a subpopulation. The predicate can be applied to the sample and/or an estimate derived therefrom. Certain exemplary embodiments can provide confidence bounds, which for a given confidence level can provide an upper bound and/or a lower bound of an estimated value. Queries can be processed from the sketch without utilizing the original dataset. Queries can be used for automatic tracking and/or mining of the dataset.

In certain exemplary embodiments, the estimator of properties of a dataset can be automatically stored. The items in the all-distance bottom-k set can be stored in order of increasing distances from a predetermined location, in order of increasing ranks, or in an arbitrary order. Certain exemplary embodiments can be adapted to, via a processor, automatically store an all-distance bottom-k sketch of a dataset on a machine-readable medium. The processor can be adapted to automatically compute estimators of the all-distance bottom-k sketch from corresponding determined estimators of a k-min sketch of the dataset. The k-min sketch can be derived from the all-distance bottom-k sketch. Certain exemplary embodiments can be adapted to, via a processor, the estimator of properties of the dataset on a machine-readable medium. The processor can be adapted to automatically compute the estimation of properties based upon computed adjusted weights of the all-distance bottom-k sketch of the dataset. The adjusted weights can be computed via a Markov-chain based method. The adjusted weights can be applied to items comprised in the bottom-k sketch. The adjusted weights can be adapted to be used to estimate a size of subpopulations of items. The bottom-k sketch can derived from the all-distance bottom-k sketch.

Figure 19:
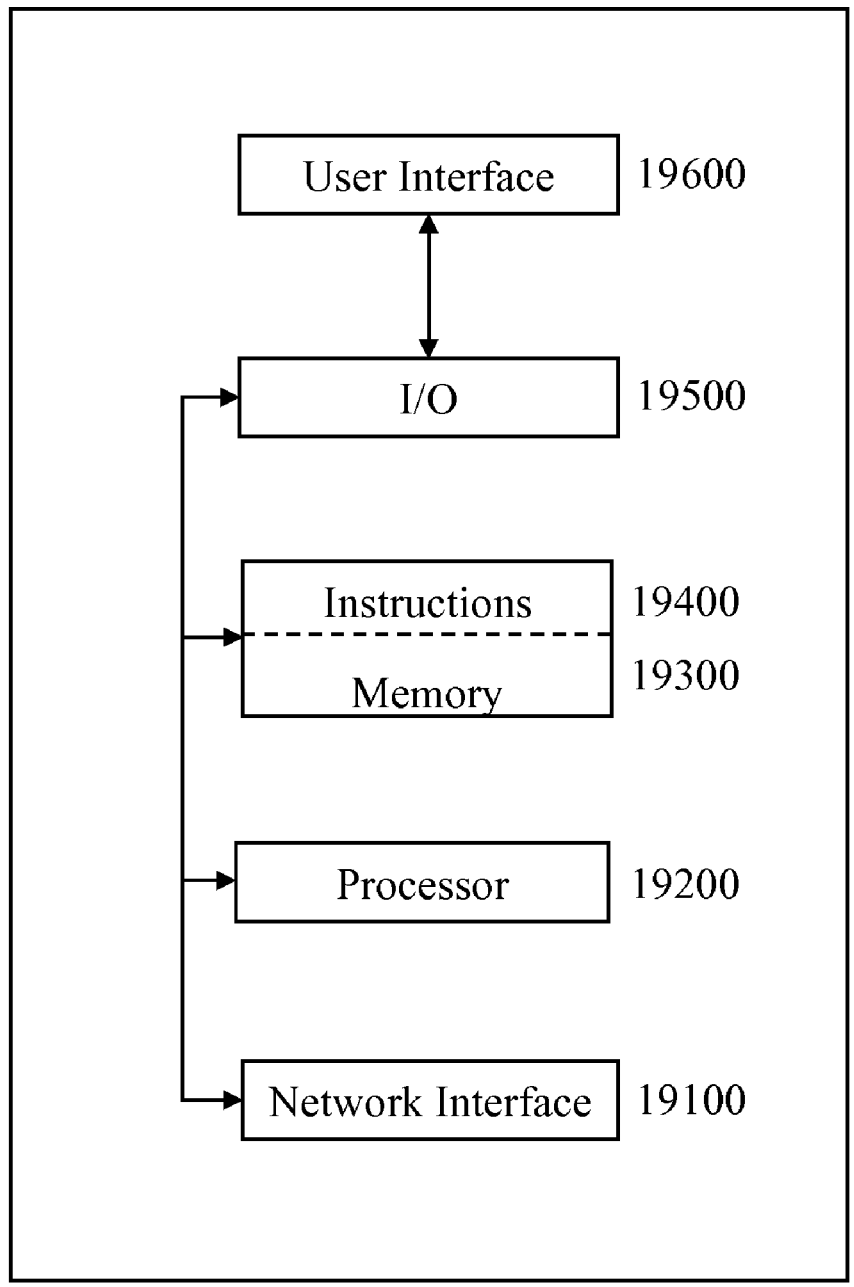
FIG. 19 is a block diagram of an exemplary embodiment of an information device 19000.

FIG. 19 is a block diagram of an exemplary embodiment of an information device 19000, which in certain operative embodiments can comprise, for example, server 3300 and information device 3100, of FIG. 3. Information device 19000 can comprise any of numerous circuits and/or components, such as for example, one or more network interfaces 19100, one or more processors 19200, one or more memories 19300 containing instructions 19400, one or more input/output (I/O) devices 19500, and/or one or more user interfaces 19600 coupled to I/O device 19500, etc. As used herein, the phrase network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device As used herein, the phrase input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected. As used herein, Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

In certain exemplary embodiments, via one or more user interfaces 19600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein. As used herein, the phrase request means (v.) to express a need and/or desire for; to inquire and/or ask for; (n.) that which communicates an expression of desire and/or that which is asked for. As used herein, the phrase create means to make, form, produce, generate, bring into being, and/or cause to exist.

As used herein, the phrase processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

Certain terms that are used substantively herein are accompanied by definitions. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

As used herein, the phrase information device means any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

As used herein, the phrase input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected. As used herein, the phrase port means a data connection in an information device and/or networking device to which a peripheral device or a transmission line from a remote terminal and/or remote system can be attached. As used herein, the phrase system means a collection of mechanisms, devices, machines, articles of manufacture, processes, data, and/or instructions, the collection designed to perform one or more specific functions.

As used herein, the phrase haptic means involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, fraction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the phrase said means when used in a system or device claim, an article indicating a subsequent claim term that has been previously introduced. As used herein, the phrase substantially means to a considerable, large, and/or great, but not necessarily whole and/or entire, extent and/or degree. As used herein, the phrase user means a person, organization, process, device, program, protocol, and/or system that uses a device, system, process, and/or service. As used herein, the phrase calculating means determining via mathematics and/or logical rules. As used herein, the phrase having means possessing. As used herein, the phrase increase means to become greater or more in size, quantity, number, degree, value, intensity, and/or power, etc. Note Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method, comprising:
    obtaining an all-distance bottom-k sketch;
    computing adjusted weights of the all-distance bottom-k sketch via a Markov-chain based method by utilizing a processor;
    deriving a bottom-k sketch from the all-distance bottom-k sketch by utilizing the processor;
    applying the adjusted weights to items in the bottom-k sketch by utilizing the processor;
    estimating properties of flows through a router based upon the adjusted weights of the all-distance bottom-k sketch of the flows and based on corresponding estimators of a k-min sketch associated with the all-distance bottom-k sketch;
    estimating a size of subpopulations of items of the flows based on the adjusted weights; and
    calculating a selectivity of the subpopulations based on the adjusted weights.

2. A method, comprising:
obtaining a sketch of a dataset having a format of at least one of a bottom-k sketch and an all-distance bottom-k sketch;
computing adjusted weights of the sketch of the dataset via a rank conditioning method by utilizing a processor;
deriving the bottom-k sketch from the all-distance bottom-k sketch by utilizing the processor;
applying the adjusted weights to items in the sketch of the dataset by utilizing the processor;
determining an estimator of properties of the dataset based on the sketch of the dataset, the adjusted weights, and on corresponding estimators of a k-min sketch associated with the all-distance bottom-k sketch;
rendering the estimator of the properties of the dataset; and
estimating a size of subpopulations of items of the dataset based on the adjusted weights.

3. The method of claim 2, further comprising
summing the adjusted weights over the items of the subpopulations.

4. The method of claim 2, further comprising
updating the bottom-k sketch in response to the items in the sketch of the dataset.

5. The method of claim 2, further comprising
computing the adjusted weights via the rank conditioning method, wherein the rank conditioning method is configured to determine a rank conditioning estimator that has zero covariances between different records of the dataset.

6. The method of claim 2, further comprising
computing the adjusted weights via a subset-conditioning method, wherein the estimator is based upon the adjusted weights.

7. The method of claim 2, further comprising
computing the adjusted weights via a subset-conditioning method, wherein the subset-conditioning method is configured to compute a subset conditioning estimator, wherein the subset conditioning estimator has negative covariances between different records of the dataset.

8. The method of claim 2, further comprising
computing the adjusted weights for items comprised in the all-distance bottom-k sketch, wherein the bottom-k sketch has exponentially distributed ranks and a known total weight.

9. The method of claim 2, further comprising
calculating confidence intervals on subpopulation-size based upon the all-distance bottom-k sketch, wherein the estimator is based upon the confidence intervals.

10. The method of claim 2, further comprising
estimating a variance of aid the estimator.

11. The method of claim 2, further comprising
calculating a selectivity of the dataset based upon the adjusted weights.

12. The method of claim 2, further comprising
answering a subpopulation weight query of the dataset based upon the adjusted weights.

13. The method of claim 2, further comprising
determining a total weight of the dataset using the bottom-k sketch.

14. The method of claim 2, wherein
the bottom-k sketch is a coordinated sketch of a plurality of bottom-k sketches.

15. The method of claim 2, wherein
the bottom-k sketch comprises a single stored rank value.

16. The method of claim 2, wherein
an underlying family of probability distributions used to determine rank values, upon which the bottom-k sketch is computed, are exponentially distributed with parameter equal to a weight of a corresponding item.

17. The method of claim 2, wherein
the adjusted weights are unbiased.

18. A method, comprising:
obtaining a sketch of a dataset having a format of at least one of a bottom-k sketch and an all-distance bottom-k sketch;
computing adjusted weights of the sketch of the dataset via a subset conditioning method by utilizing a processor;
deriving the bottom-k sketch from the all-distance bottom-k sketch by utilizing the processor;
applying the adjusted weights to items in the sketch of the dataset by utilizing the processor;
determining an estimator of properties of the dataset based on the sketch of the dataset, the adjusted weights, and on corresponding estimators of a k-min sketch associated with the all-distance bottom-k sketch;
rendering the estimator of the properties of the dataset; and
estimating a size of subpopulations of the items in the sketch of the dataset based on the adjusted weights.

19. A method, comprising:
obtaining a sketch of a dataset having a format of at least one of a bottom-k sketch and an all-distance bottom-k sketch;
computing adjusted weights of the sketch via a Markov-chain based method by utilizing a processor;
deriving the bottom-k sketch from the all-distance bottom-k sketch by utilizing the processor;
applying the adjusted weights to items in the sketch of the dataset by utilizing the processor;
determining an estimator of properties of the dataset based on the sketch of the dataset, the adjusted weights, and on corresponding estimators of a k-min sketch associated with the all-distance bottom-k sketch;
rendering the estimator of the properties of the dataset; and
estimating a size of subpopulations of the items in the sketch of the dataset based on the adjusted weights.

20. The method of claim 19, further comprising determining a selectivity of the subpopulations based on the adjusted weights.

* * * * *